United States Patent
Hishida et al.

(10) Patent No.: US 12,420,197 B2
(45) Date of Patent: Sep. 23, 2025

(54) STORAGE MEDIUM, GAME SYSTEM AND GAME CONTROL METHOD

(71) Applicant: Nintendo Co., Ltd., Kyoto (JP)

(72) Inventors: Daiki Hishida, Osaka (JP); Abebe Tinari, Osaka (JP); Takaaki Yamaguchi, Osaka (JP); Misaki Shindo, Osaka (JP)

(73) Assignee: Nintendo Co., Ltd., Kyoto (JP)

( * ) Notice: Subject to any disclaimer, the term of this patent is extended or adjusted under 35 U.S.C. 154(b) by 242 days.

(21) Appl. No.: 18/478,622

(22) Filed: Sep. 29, 2023

(65) Prior Publication Data

US 2024/0115950 A1 Apr. 11, 2024

(30) Foreign Application Priority Data

Oct. 11, 2022 (JP) .................. 2022-162947

(51) Int. Cl.
- *A63F 13/56* (2014.01)
- *A63F 13/44* (2014.01)
- *A63F 13/5372* (2014.01)
- *A63F 13/54* (2014.01)
- *A63F 13/814* (2014.01)
- *A63F 13/428* (2014.01)

(52) U.S. Cl.
CPC ............ *A63F 13/56* (2014.09); *A63F 13/44* (2014.09); *A63F 13/5372* (2014.09); *A63F 13/54* (2014.09); *A63F 13/814* (2014.09); *A63F 13/428* (2014.09); *A63F 2300/64* (2013.01)

(58) Field of Classification Search
CPC ...... A63F 13/56; A63F 13/44; A63F 13/5372; A63F 13/54; A63F 13/814; A63F 13/428; A63F 2300/64

USPC .......................................... 463/31
See application file for complete search history.

(56) References Cited

U.S. PATENT DOCUMENTS

| | | | |
|---|---|---|---|
| 6,544,123 B1 * | 4/2003 | Tanaka ............. | A63F 13/53 463/43 |
| 7,137,891 B2 * | 11/2006 | Neveu ............. | A63F 13/42 463/31 |
| 9,486,705 B2 * | 11/2016 | Chiwata .......... | A63F 13/843 |
| 9,844,730 B1 * | 12/2017 | Dawson .......... | A63F 13/211 |
| 10,617,944 B2 * | 4/2020 | Kojima ........... | A63F 13/211 |
| 2019/0232175 A1 | 8/2019 | Morishita et al. | |

FOREIGN PATENT DOCUMENTS

| | | |
|---|---|---|
| JP | 2003117233 A | 4/2003 |
| JP | 2006314434 A | 11/2006 |
| JP | 2013059425 A | 4/2013 |
| JP | 2015039383 A | 3/2015 |
| JP | 2019129971 A | 8/2019 |

* cited by examiner

*Primary Examiner* — Allen Chan
(74) *Attorney, Agent, or Firm* — Nixon & Vanderhye PC

(57) ABSTRACT

A non-limiting example game system includes a main body apparatus that executes a main story of a virtual game, and a game screen is displayed on a display device. If a player operates a ZL button when a predetermined flower object is arranged near a player character, a magic circle appears in front of the player character, and a rhythm game is started. In the rhythm game, a first marker is moved around the player character along an orbiting trajectory, and the player tilts an analog stick at a timing that the first marker arrives at a position that a second marker is arranged so as to designate the position that the second marker is arranged.

17 Claims, 29 Drawing Sheets

GAME SCREEN 200

EXAMPLE THAT NUMBER OF SECOND (2ND) MARKERS IS FOUR IN FOUR-QUARTER TIME

EXAMPLE THAT NUMBER OF SECOND (2ND) MARKERS IS THREE IN THREE-QUARTER TIME

CASE WHERE TEMPO IS SIXTY IN THREE-QUARTER TIME

CASE WHERE TEMPO IS SIXTY IN FOUR-QUARTER TIME

CASE WHERE TEMPO IS ONE-HUNDRED AND TWENTY IN THREE-QUARTER TIME

FIG. 17

DATA STORAGE AREA 854

| |
|---|
| OPERATION DATA — 854a |
| IMAGE GENERATION DATA — 854b |
| SOUND DATA — 854c |
| PLAYER CHARACTER DATA — 854d |
| ANALYSIS DATA — 854e |
| MOVING SPEED DATA — 854f |
| CANDIDATE POSITION DATA — 854g |
| FIRST MARKER DATA — 854h |
| SECOND MARKER DATA — 854i |
| THIRD MARKER DATA — 854j |
| CURRENT TIMING DETERMINATION RANGE DATA — 854k |
| CURRENT DIRECTION DETERMINATION RANGE DATA — 854m |
| SMALL RHYTHM GAME SUCCESS DETERMINATION DATA — 854n |
| LARGE RHYTHM GAME CLEAR DETERMINATION DATA — 854p |
| FIRST MARKER DISPLAY FLAG — 854q |
| WAIT FLAG — 854r |
| SMALL RHYTHM GAME SUCCESS FLAG — 854s |
| LARGE RHYTHM GAME CLEAR FLAG — 854t |
| FIRST OUTPUT FLAG — 854u |
| SECOND OUTPUT FLAG — 854v |
| EFFECT ACTIVATION FLAG — 854w |
| TIMER — 854x |
| ⋮ |

ANOTHER EXAMPLE THAT NUMBER OF SECOND (2ND) MARKERS IS TWO IN FOUR-QUARTER TIME

STORAGE MEDIUM, GAME SYSTEM AND GAME CONTROL METHOD

CROSS REFERENCE OF RELATED APPLICATION

This application claims a priority to Japanese Patent Application No. 2022-162947 filed on Oct. 11, 2022, and the entire contents of which are incorporated herein by reference.

FIELD

This application describes a storage medium, a game system and a game control method, in which a rhythm game is playable.

SUMMARY

It is primary object of an embodiment(s) to provide a novel storage medium, game system and game control method.

Moreover, it is another object of the embodiment(s) to provide a storage medium, game system and game control method, capable of playing a new rhythm game that follows intuition using a control device that a tilting operation or sliding operation can be performed.

A first embodiment is a non-transitory computer-readable storage medium having stored with a game program executable by an information processing apparatus comprising one or more processors, wherein the game program causes the one or more processors of the information processing apparatus to execute: acquiring operation direction data that is transmitted from a control device provided with the stick capable of manually performing a tilting operation or sliding operation in an arbitrary direction and indicates a direction that a stick is operated; and executing first game processing, in the first game processing, moving, in a virtual space, a first marker orbitally along an orbiting trajectory; arranging a second marker indicating a position along the orbiting trajectory; and determining that a stick operation is in success if the operation direction data indicates that the stick is operated in a predetermined direction corresponding to a position indicated by the second marker when the first marker exists in a predetermined range including the position indicated by the second marker.

According to the first embodiment, since a success or failure is determined by a tilting operation or sliding operation in a direction with respect to a position that is indicated by a second marker when a first marker exists in a predetermined range including the position that the second marker indicates, it is possible to play a new rhythm game that follows intuition using a control device a tilting operation or sliding operation can be performed.

A second embodiment is the storage medium according to the first embodiment, wherein the game program causes the one or more processors to execute: executing second game processing different from the first game processing; moving, in the second game processing, a player character in the virtual space based on the operation direction data; and setting, in the first game processing, the orbiting trajectory to surround the player character.

According to the second embodiment, since a direction that is input by the tilting operation or sliding operation in the first game substantially corresponds to the direction toward the position that the second marker indicates with respect to the position of the player character, it is possible to perform a more intuitive operation.

A third embodiment is the storage medium according to the second embodiment, wherein the game program causes the one or more processor to execute starting the first game processing when player character performs a predetermined action during execution of the second game processing.

According to the third embodiment, it is possible to start the first game smoothly from the second game.

A fourth embodiment is the storage medium according to the third embodiment, wherein the predetermined action is an action that the player character performs with facing a direction of an object arranged in the virtual space, wherein the game program causes the one or more processors to execute setting the position indicated by the second marker based on a positional relationship between a direction of the player character and the object.

According to the fourth embodiment, since the second marker is arranged according to a direction of the player character that performs the predetermined action, it is possible for the player to start the rhythm game at an arbitrary timing and at a position that is easy to see and easy to operate.

A fifth embodiment is the storage medium according to the third embodiment, wherein the game program causes the one or more processors to execute: reproducing continuously a musical piece that is being reproduced in the second game processing at a time of starting the first game processing during the second game processing; and arranging the second marker to indicate a position(s) of a number equal to or less than a maximum arranging number corresponding to a beat of the musical piece.

According to the fifth embodiment, since the number of the second markers to be arranged is determined according to the musical piece that is currently reproduced in the second game, the player can shift to the first game without discomfort.

A sixth embodiment is the storage medium according to the third embodiment, wherein the game program causes the one or more processors to execute: reproducing continuously a musical piece that is being reproduced in the second game processing, when starting the first game processing during the second game processing; and determining the position indicated by the second marker out of multiple candidate positions that are along the orbiting trajectory and set based on a beat of the musical piece.

According to the sixth embodiment, since the second marker is arranged according to the musical piece that is currently reproduced in the second game, the player can play the first game without discomfort.

A seventh embodiment is the storage medium according to the sixth embodiment, wherein the game program causes the one or more processors to execute: executing the first game processing in a plurality of times continuously; determining, for each first game processing, the position indicated by the second marker out of the candidate positions; and generating a sound effect when the first marker exists at a position overlapping with the candidate positions.

According to the seventh embodiment, since the player can keep the rhythm with the sound effects during a plurality of consecutive first games even if the second marker is arranged in the first game of the second time at a position that the second marker has not been arranged in the first game of the first time, it is easy for the player to input.

An eighth embodiment is the storage medium according to the seventh embodiment, wherein the game program causes the one or more processors to execute generating another different sound effect when the first marker exists at a position overlapping with the position indicated by the second marker out of the candidate positions.

According to the eighth embodiment, since different sound effects are generated in the position that the second marker indicates and the candidate position that the second marker is not arranged, it is possible for the player to easily know the second marker that is an operation target by the difference in sound.

A ninth embodiment is the storage medium according to the third embodiment, wherein the game program causes the one or more processors to execute: reproducing continuously a musical piece that is being reproduced in the second game processing at a time of starting the first game processing during the second game processing; and setting a speed for moving the first marker based on a tempo of the musical piece.

According to the ninth embodiment, since a moving speed of the first marker is determined according to the musical piece that is reproduced in the second game, the player can shift to the first game without discomfort.

A tenth embodiment is the storage medium according to the first embodiment, wherein the game program causes the one or more processors to execute: moving the first marker along the orbiting trajectory in a plurality of rounds in the first game processing; and determining in the first game processing that the first game processing is cleared at a time that all operations with respect to the second markers are successfully performed in an order being set during one round of the orbiting trajectory.

An eleventh embodiment is the storage medium according to the tenth embodiment, wherein the second marker that is set at a first place or a last place in the order out of the second markers that are set in the order has a visual feature different from those of remaining second markers.

According to the eleventh embodiment, even when the first marker is moved along the orbiting trajectory round and round, by making the second marker that is set at the first place or the last place has a visible feature that is different from those of other second markers, it is possible to easily know which second marker is to be designated first and which second marker is to be designated last.

A twelfth embodiment is the storage medium according to the eleventh embodiment, wherein the game program causes the one or more processors to execute arranging the second marker that is set at a first place or a last place in the order so as to indicate a position based on the direction that the player character faces out of the positions along the orbiting trajectory.

According to the twelfth embodiment, since an input direction with respect to the second marker that is set at the first place or the last place is a direction that the player character faces, it is possible for the player to start the rhythm game at an arbitrary timing and at a position that is easy to see and easy to operate.

A thirteenth embodiment is the storage medium according to the eleventh embodiment, wherein the game program causes the one or more processors to execute making, in the first game processing, different from each other, the sound effect generated at a time that the first marker exists at a position overlapping with the position indicated by the second marker that is set at the first place or the last place in the order and the sound effect generated at a time that the first marker exists at a position overlapping with the position indicated by the second marker different from the second maker that is set at the first place or the last place in the order.

According to the thirteenth embodiment, since the sound effect that is to be generated in a case where the first marker exists at a position overlapped with a position that is indicated by the second marker that is set at the first place or the last place is made to be different from the sound effect that is to be generated in a case where the first marker exists at a position overlapped with a position that is indicated by other second markers, even if it the first marker is moved along the orbiting trajectory round and round, it is possible to easily know which second marker is to be designated first and which second marker is to be designated last.

A fourteenth embodiment is the storage medium according to the first embodiment, wherein the game program causes the one or more processors to execute arranging the second positions in plural number to have a central angle between adjacent positions is equal to or larger than 90 degrees or more.

According to the fourteenth embodiment, it is possible to make an input direction of the player in a case where the tilting operation or sliding operation of the stick to be performed easy to determine.

A fifteenth embodiment is the storage medium according to the first embodiment, wherein the game program causes the one or more processors to execute displaying a locus that the first marker is moved during a predetermined time period.

According to the fifteenth embodiment, it is possible to make intelligible a direction that the first marker is rotated. Moreover, even if the first marker is hidden behind the player character or the like, an approximate position of the first marker can be grasped.

A sixteenth embodiment is a game system comprising one or more processors, wherein in the game processing, the one or more processors is configured to execute: acquiring operation direction data that is transmitted from a control device provided with the stick capable of manually performing a tilting operation or sliding operation in an arbitrary direction and indicates a direction that a stick is operated; and executing first game processing, in the first game processing, moving, in a virtual space, a first marker orbitally along an orbiting trajectory; arranging a second marker indicating a position along the orbiting trajectory; and determining that a stick operation is in success if the operation direction data indicates that the stick is operated in a predetermined direction corresponding to a position indicated by the second marker when the first marker exists in a predetermined range including the position indicated by the second marker.

A seventeenth embodiment is a game control method of a game apparatus, wherein the game control method comprising: acquiring operation direction data that is transmitted from a control device provided with the stick capable of manually performing a tilting operation or sliding operation in an arbitrary direction and indicates a direction that a stick is operated; and executing first game processing, in the first game processing, moving, in a virtual space, a first marker orbitally along an orbiting trajectory; arranging a second marker indicating a position along the orbiting trajectory; and determining that a stick operation is in success if the operation direction data indicates that the stick is operated in a predetermined direction corresponding to a position indicated by the second marker when the first marker exists in a predetermined range including the position indicated by the second marker.

According also to the sixteenth embodiment and the seventeenth embodiment, like the first embodiment, it is possible to play a new rhythm game that follows intuition using a control device a tilting operation or sliding operation can be performed.

The above-described objects and other objects, features, aspects and advantages of the embodiment(s) will become more apparent from the following detailed description when taken in conjunction with the accompanying drawings.

BRIEF DESCRIPTION OF THE DRAWINGS

FIG. 17 is a view showing non-limiting example specific contents of a data storage area of the DRAM shown in FIG. 16.

DETAILED DESCRIPTION OF NON-LIMITING EXAMPLE EMBODIMENTS

A non-limiting example game system according to an exemplary embodiment will be described in the following. The non-limiting example game system 1 according to the embodiment comprises a main body apparatus (an information processing apparatus that functions as a game apparatus main body in the embodiment) 2, a left controller 3 and a right controller 4. The left controller 3 and the right controller 4 are attachable to or detachable from the main body apparatus 2, respectively. That is, the game system 1 can be used as a unified apparatus formed by attaching each of the left controller 3 and the right controller 4 to the main body apparatus 2. Moreover, in the game system 1, the main body apparatus 2, the left controller 3 and the right controller 4 can also be used as separate bodies (see FIG. 2). In the following, the hardware structure of the game system 1 according to the embodiment will be described, and then, the control of the game system 1 of the embodiment will be described.

Figure 1:
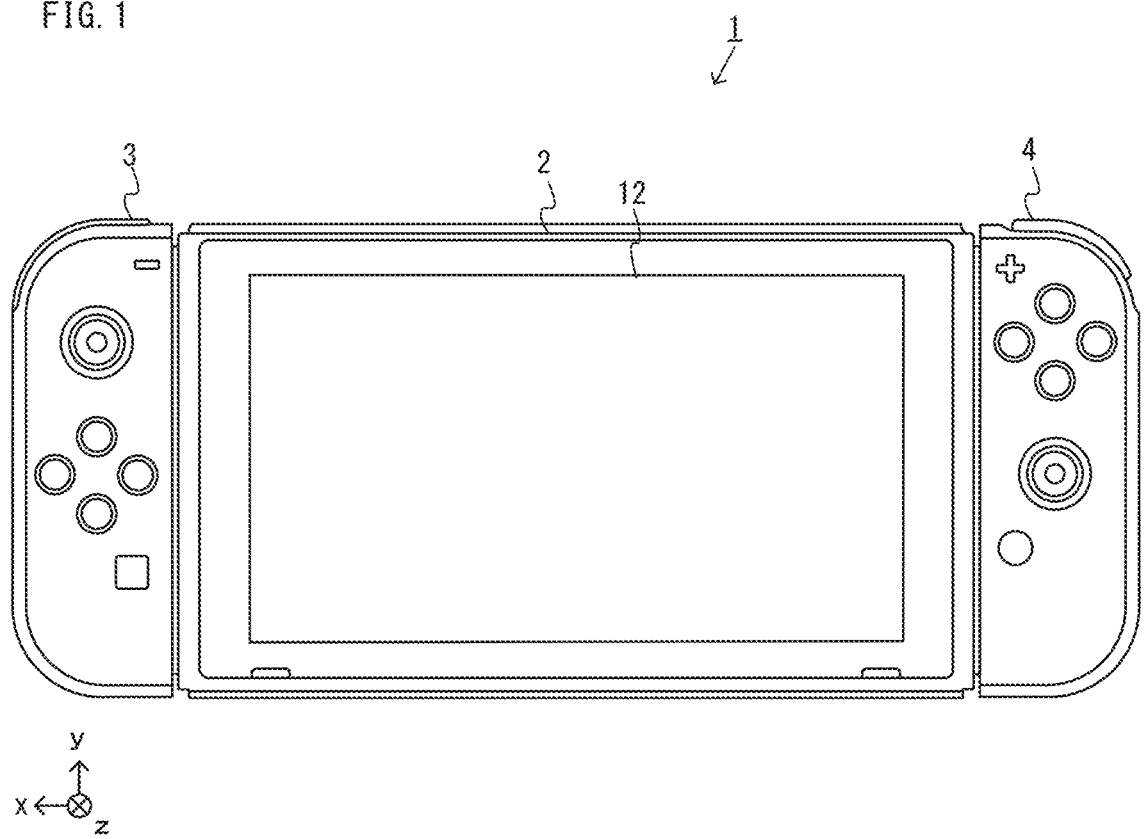
FIG. 1 is an illustration view showing a non-limiting example state wherein a left controller and a right controller are attached to a main body apparatus of this embodiment.

FIG. 1 is an illustration view showing an example of a state where the left controller 3 and the right controller 4 are attached to the main body apparatus 2. As shown in FIG. 1, the left controller 3 and the right controller 4 is respectively attached to the main body apparatus 2, thereby to be unified it. The main body apparatus 2 is an apparatus for performing various processing (game processing, for example) in the game system 1. The main body apparatus 2 comprises a display 12. Each of the left controller 3 and the right controller 4 is a device comprising an operation section with which a user provides inputs.

Figure 2:
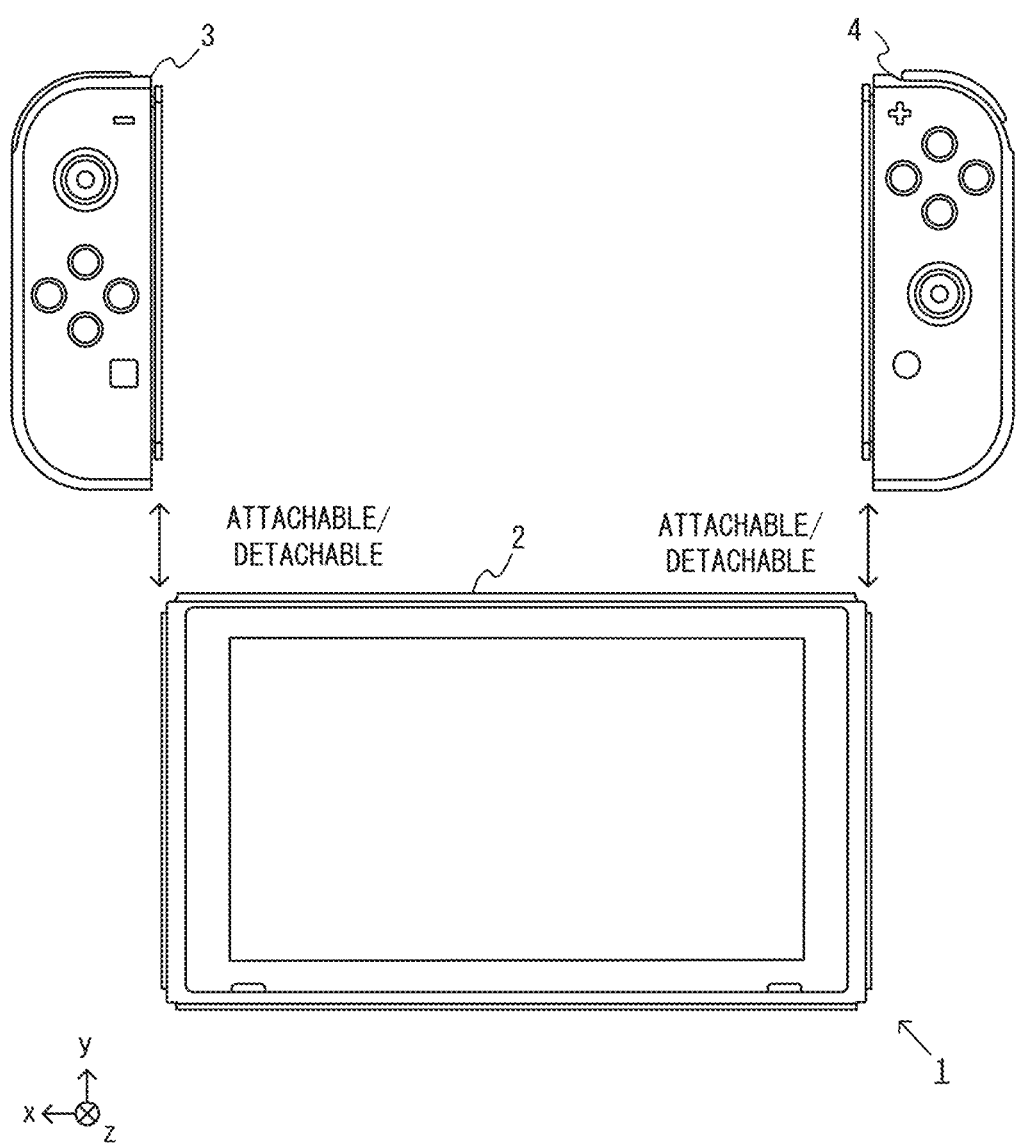
FIG. 2 is an illustration view showing a non-limiting example state where the left controller and the right controller are detached from the main body apparatus, respectively.

FIG. 2 is an illustration view showing an example of a state where the left controller 3 and the right controller 4 are detached from the main body apparatus 2, respectively. As shown in FIG. 1 and FIG. 2, each of the left controller 3 and the right controller 4 is attachable to and detachable from the main body apparatus 2. In addition, it should be noted that the left controller 3 and the right controller 4 may be referred to collectively as a "controller" in the following.

Figure 3:
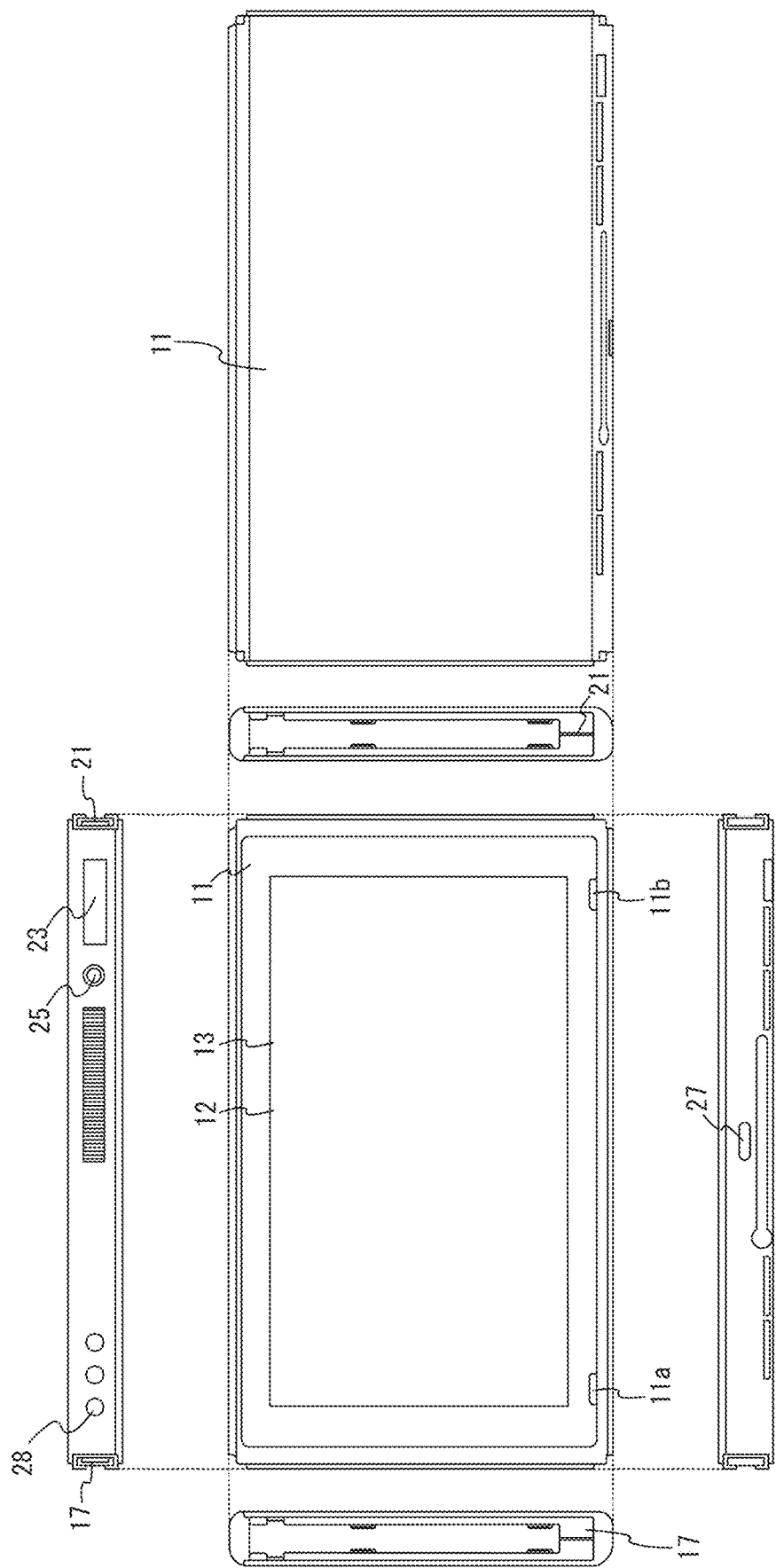
FIG. 3 is six orthogonal views showing a non-limiting example main body apparatus shown in FIG. 1 and FIG. 2.

FIG. 3 is six orthogonal views showing an example of the main body apparatus 2. As shown in FIG. 3, the main body apparatus 2 comprises a housing 11 having an approximately plate-shape. In the embodiment, a main surface (in other words, a surface on a front side, that is, a surface on which the display 12 is provided) of the housing 11 has a generally rectangular shape.

In addition, a shape and a size of the housing 11 are optional. As an example, the housing 11 may be of a portable size. Moreover, the main body apparatus 2 alone or the unified apparatus obtained by attaching the left controller 3 and the right controller 4 to the main body apparatus 2 may be a mobile apparatus. The main body apparatus 2 or the unified apparatus may be a handheld apparatus. The main body apparatus 2 or the unified apparatus may be a handheld apparatus or a portable apparatus.

As shown in FIG. 3, the main body apparatus 2 comprises the display 12 that is provided on the main surface of the housing 11. The display 12 displays an image generated by the main body apparatus 2. In the embodiment, the display 12 is a liquid crystal display device (LCD). However, the display 12 may be an arbitrary type display.

Moreover, the main body apparatus 2 comprises a touch panel 13 on a screen of the display 12. In the embodiment, the touch panel 13 is of a type that allows a multi-touch input (e.g., a capacitive type). However, the touch panel 13 may be of any type, and for example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are emitted through the speaker holes 11a and 11b.

Moreover, the main body apparatus 2 comprises a left terminal 17 that is a terminal for the main body apparatus 2 to perform wired communication with the left controller 3, and a right terminal 21 that is a terminal for the main body apparatus 2 performs wired communication with the right controller 4.

As shown in FIG. 3, the main body apparatus 2 comprises a slot 23. The slot 23 is provided on an upper side surface of the housing 11. The slot 23 has a shape to which a predetermined type of storage medium can be attached. The predetermined type of storage medium is, for example, a dedicated storage medium (e.g., a dedicated memory card) for the game system 1 or an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Moreover, the main body apparatus 2 comprises a power button 28.

The main body apparatus 2 comprises a lower terminal 27. The lower terminal 27 is a terminal through which the main body apparatus 2 performs communication with a cradle. In the embodiment, the lower terminal 27 is a USB connector (more specifically, a female connector). When the unified apparatus or the main body apparatus 2 alone is put on the cradle, the game system 1 can display on a stationary monitor an image generated by and output from the main body apparatus 2. Moreover, in the embodiment, the cradle has the function of charging the unified apparatus or the main body apparatus 2 alone that is put on the cradle. Moreover, the cradle has a function of a hub device (specifically, a USB hub).

Figure 4:
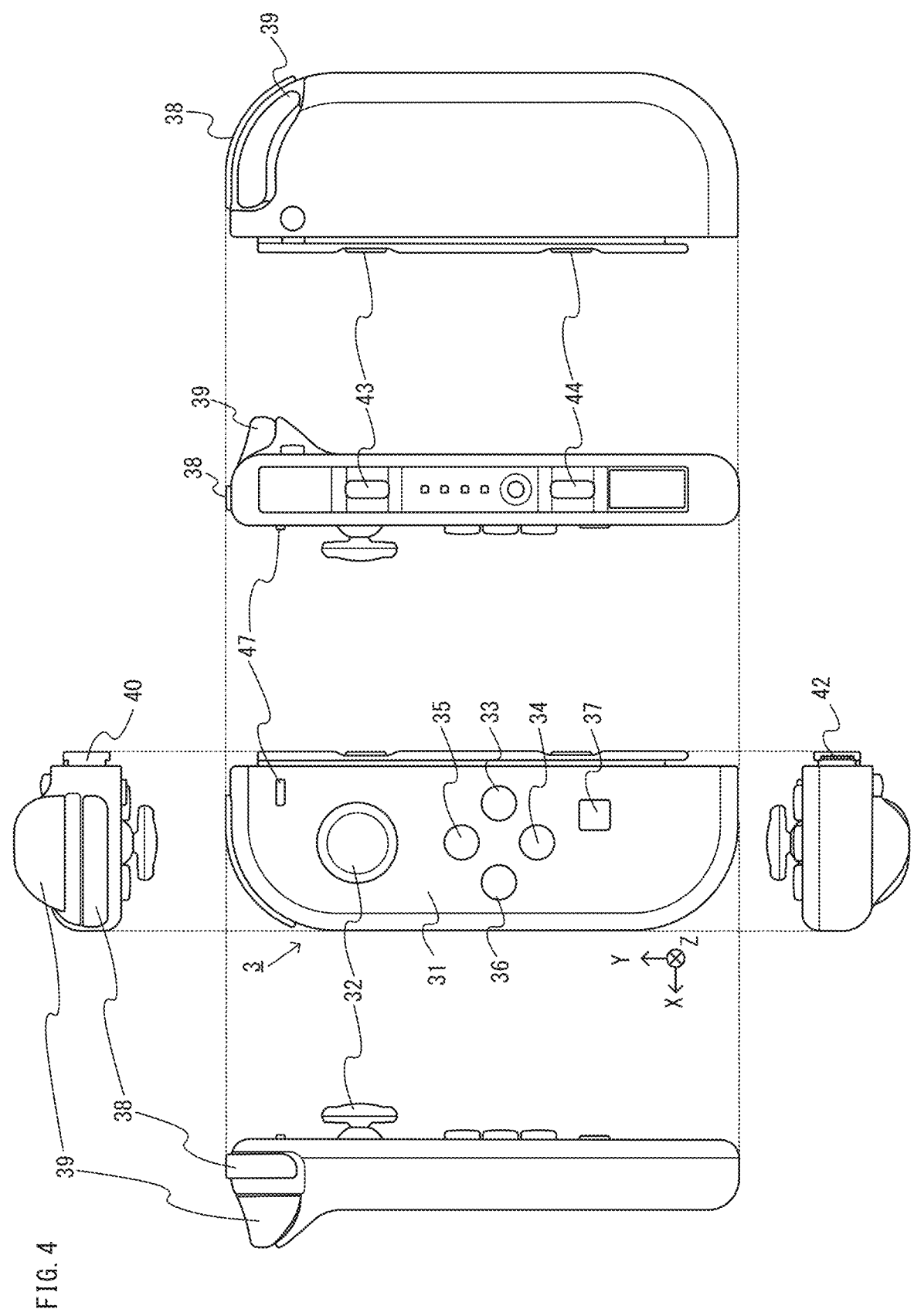
FIG. 4 is sixth orthogonal views showing a non-limiting example left controller shown in FIG. 1 and FIG. 2.

FIG. 4 is six orthogonal views showing an example of the left controller 3. As shown in FIG. 4, the left controller 3 comprises a housing 31. In the embodiment, the housing 31 has a vertically long shape, that is, is shaped to be long in an up-down direction (i.e., a y-axis direction shown in FIG. 1 and FIG. 4). In a state where the left controller 3 is detached from the main body apparatus 2, the left controller 3 can also be held in a direction that the left controller 3 is vertically long. The housing 31 has a shape and a size that when held in a direction that the housing 31 is vertically long, the housing 31 can be held with one hand, especially the left hand. Moreover, the left controller 3 can also be held in a direction that the left controller 3 is horizontally long. When held in the direction that the left controller 3 is horizontally long, the left controller 3 may be held with both hands.

The left controller 3 comprises an analog stick 32. As shown in FIG. 4, the analog stick 32 is provided on a main surface of the housing 31. The analog stick 32 can be used as a direction input section capable of inputting a direction. The user tilts the analog stick 32 and thereby can input a direction corresponding to a tilted direction (and input a magnitude corresponding to a tilted angle). In addition, the left controller 3 may comprise a cross key or a slide stick capable of performing a slide input, or the like as the direction input section, instead of the analog stick. Moreover, in the embodiment, it is possible to provide an input by pressing the analog stick 32.

The left controller 3 comprises various operation buttons. The left controller 3 comprises four (4) operation buttons 33-36 (specifically, a right direction button 33, a down direction button 34, an up direction button 35 and a left direction button 36) on the main surface of the housing 31. Furthermore, the left controller 3 comprises a record button 37 and a "−" (minus) button 47. The left controller 3 comprises an L-button 38 and a ZL-button 39 in an upper left portion of a side surface of the housing 31. Moreover, the left controller 3 comprises an SL-button 43 and an SR-button 44 on a surface at a side to be attached to the main body apparatus 2 out of side surfaces of the housing 31. These operation buttons are used to input instructions according to various programs (e.g., an OS program and an application program) executed by the main body apparatus 2.

Moreover, the left controller 3 comprises a terminal 42 for the left controller 3 to perform wired communication with the main body apparatus 2.

Figure 5:
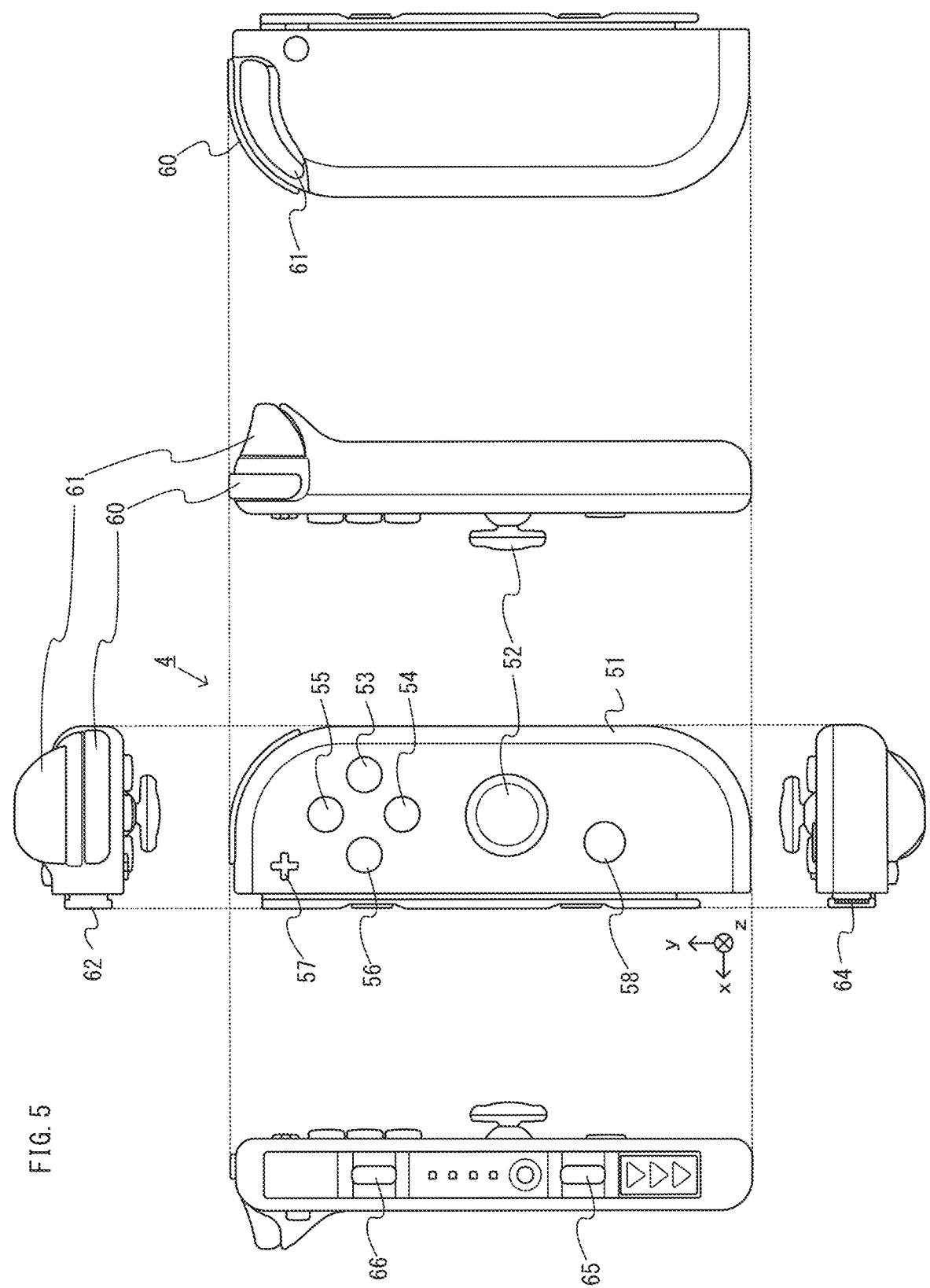
FIG. 5 is sixth orthogonal views showing a non-limiting example right controller shown in FIG. 1 and FIG. 2.

FIG. 5 is six orthogonal views showing an example of the right controller 4. As shown in FIG. 5, the right controller 4 comprises a housing 51. In the embodiment, the housing 51 has a vertically long shape, that is, a shape long in the up-down direction. In a state where the right controller 4 is detached from the main body apparatus 2, the right controller 4 can also be held in a direction that the right controller 4 is vertically long. The housing 51 has a shape and a size that when held in a direction that the housing 51 is vertically long, the housing 51 can be held with one hand, especially the right hand. Moreover, the right controller 4 can also be held in a direction that the right controller 4 is horizontally long. When held in the direction that the right controller 4 is horizontally long, the right controller 4 may be held with both hands.

Similar to the left controller 3, the right controller 4 comprises an analog stick 52 as a direction input section. In the embodiment, the analog stick 52 has the same configuration as that of the analog stick 32 of the left controller 3. Moreover, the right controller 4 may comprise a cross key or a slide stick capable of performing a slide input, or the like as the direction input section, instead of the analog stick. Moreover, similar to the left controller 3, the right controller 4 comprises four (4) operation buttons 53-56 (specifically, an A-button 53, a B-button 54, an X-button 55 and a Y-button 56) on the main surface of the housing 51. Furthermore, the right controller 4 comprises a "+" (plus) button 57 and a home button 58. Moreover, the right controller 4 comprises an R-button 60 and a ZR-button 61 in an upper right portion of a side surface of the housing 51. Moreover, similar to the left controller 3, the right controller 4 comprises an SL-button 65 and an SR-button 66.

Moreover, the right controller 4 comprises a terminal 64 for the right controller 4 to perform wired communication with the main body apparatus 2.

Figure 6:
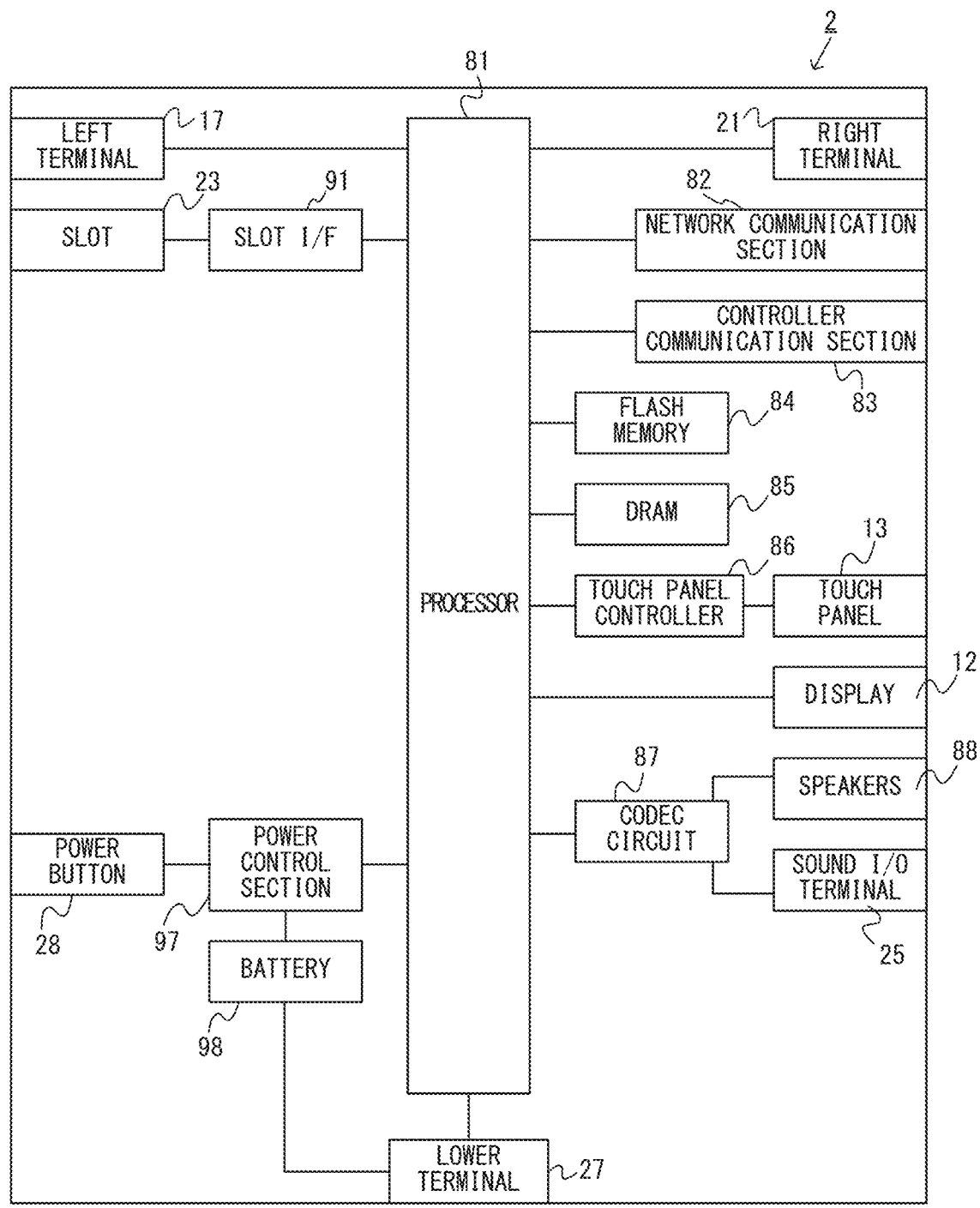
FIG. 6 is a block diagram showing a non-limiting example internal configuration of the main body apparatus shown in FIG. 1 and FIG. 2.

FIG. 6 is a block diagram showing an example of an internal configuration of the main body apparatus 2. The main body apparatus 2 comprises components 81-91, 97 and 98 shown in FIG. 6 in addition to components shown in FIG. 3. Some of the components 81-91, 97 and 98 may be mounted as electronic components on an electronic circuit board to be accommodated in the housing 11.

The main body apparatus 2 comprises a processor 81. The processor 81 is an information processing section that performs various types of information processing to be performed by the main body apparatus 2, and may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 comprises a flash memory 84 and a DRAM (Dynamic Random Access Memory) 85 as examples of internal storage media incorporated in the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 comprises a slot interface (hereinafter, abbreviated as "I/F") 91. The slot I/F 91 is connected to the processor 81. The slot I/F 91 is connected to the slot 23, and reads and writes, in accordance with instructions from the processor 81, data from and to the predetermined type of storage medium (e.g., a dedicated memory card) attached to the slot 23.

The processor 81 appropriately reads and writes data from and to the flash memory 84, the DRAM 85 and each of the above storage media, thereby performing the above-described information processing.

The main body apparatus 2 comprises a network communication section 82. The network communication section 82 is connected to the processor 81. The network communication section 82 performs communication (specifically, wireless communication) with external apparatus via a network. In the embodiment, as a first communication manner, the network communication section 82 is connected to a wireless LAN (Local Area Network) to perform communication with external apparatus by a system in conformity with the Wi-Fi standard. Moreover, as a second communication manner, the network communication section 82 performs wireless communication with a further main body apparatus 2 of the same type by a predetermined communication system (e.g., communication based on a unique protocol or infrared light communication). In addition, the wireless communication in the above-described second communication manner achieves a function of enabling so-called "local communication", in which the main body apparatus 2 can perform wireless communication with further main body apparatus 2 placed in a closed LAN, and a plurality of main body apparatus 2 perform communication directly with each other to transmit and receive data.

The main body apparatus 2 comprises a controller communication section 83. The controller communication section 83 is connected to the processor 81. The controller communication section 83 performs wireless communication with the left controller 3 and/or the right controller 4. Although communication system between the main body apparatus 2 and the left controller 3 and the right controller 4 is optional, in the embodiment, the controller communication section 83 performs communication with the left controller 3 and with the right controller 4 in conformity with Bluetooth (registered trademark) standard.

The processor 81 is connected to the left terminal 17, the right terminal 21 and the lower terminal 27. When performing wired communication with the left controller 3, the processor 81 transmits data to the left controller 3 via the left terminal 17 and receives (or acquires) operation data from the left controller 3 via the left terminal 17. Moreover, when performing wired communication with the right controller 4, the processor 81 transmits data to the right controller 4 via the right terminal 21 and receives (or acquires) operation data from the right controller 4 via the right terminal 21. Moreover, when performing communication with the cradle, the processor 81 transmits data to the cradle via the lower terminal 27. Thus, in the embodiment, the main body apparatus 2 can perform both wired communication and wireless communication with each of the left controller 3 and the right controller 4. Moreover, when the unified apparatus formed by attaching the left controller 3 and the right controller 4 to the main body apparatus 2 or the main body apparatus 2 alone is attached to the cradle, the main body apparatus 2 can output data (e.g., display image data and sound data) to the stationary monitor or the like via the cradle.

Here, the main body apparatus 2 can perform communication with a plurality of left controllers 3 simultaneously (in other words, in parallel). Moreover, the main body apparatus 2 can perform communication with a plurality of right controllers 4 simultaneously (in other words, in parallel). Therefore, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 comprises a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input is performed, and outputs the data to the processor 81.

Moreover, the display 12 is connected to the processor 81. The processor 81 displays a generated image (e.g., an image generated by performing the above information processing) and/or an externally acquired image on the display 12.

The main body apparatus 2 comprises a codec circuit 87 and speakers (specifically, a left speaker and a right speaker) 88. The codec circuit 87 is connected to the speakers 88 and a sound input/output (I/O) terminal 25 and also connected to the processor 81. The codec circuit 87 is a circuit for controlling an input/output of sound data to and from the speakers 88 and the sound input/output terminal 25.

The main body apparatus 2 comprises a power control section 97 and a battery 98. The power control section 97 is connected to the battery 98 and the processor 81. Moreover, although not shown in FIG. 6, the power control section 97 is connected to respective components of the main body apparatus 2 (specifically, components that receive power supplied from the battery 98, the left terminal 17 and the right terminal 21). Based on a command from the processor 81, the power control section 97 controls power supply from the battery 98 to the above-described components.

Moreover, the battery 98 is connected to the lower terminal 27. When an external charging device (e.g., a cradle) is connected to the lower terminal 27, and power is supplied to the main body apparatus 2 via the lower terminal 27, the battery 98 is charged with the supplied power.

Figure 7:
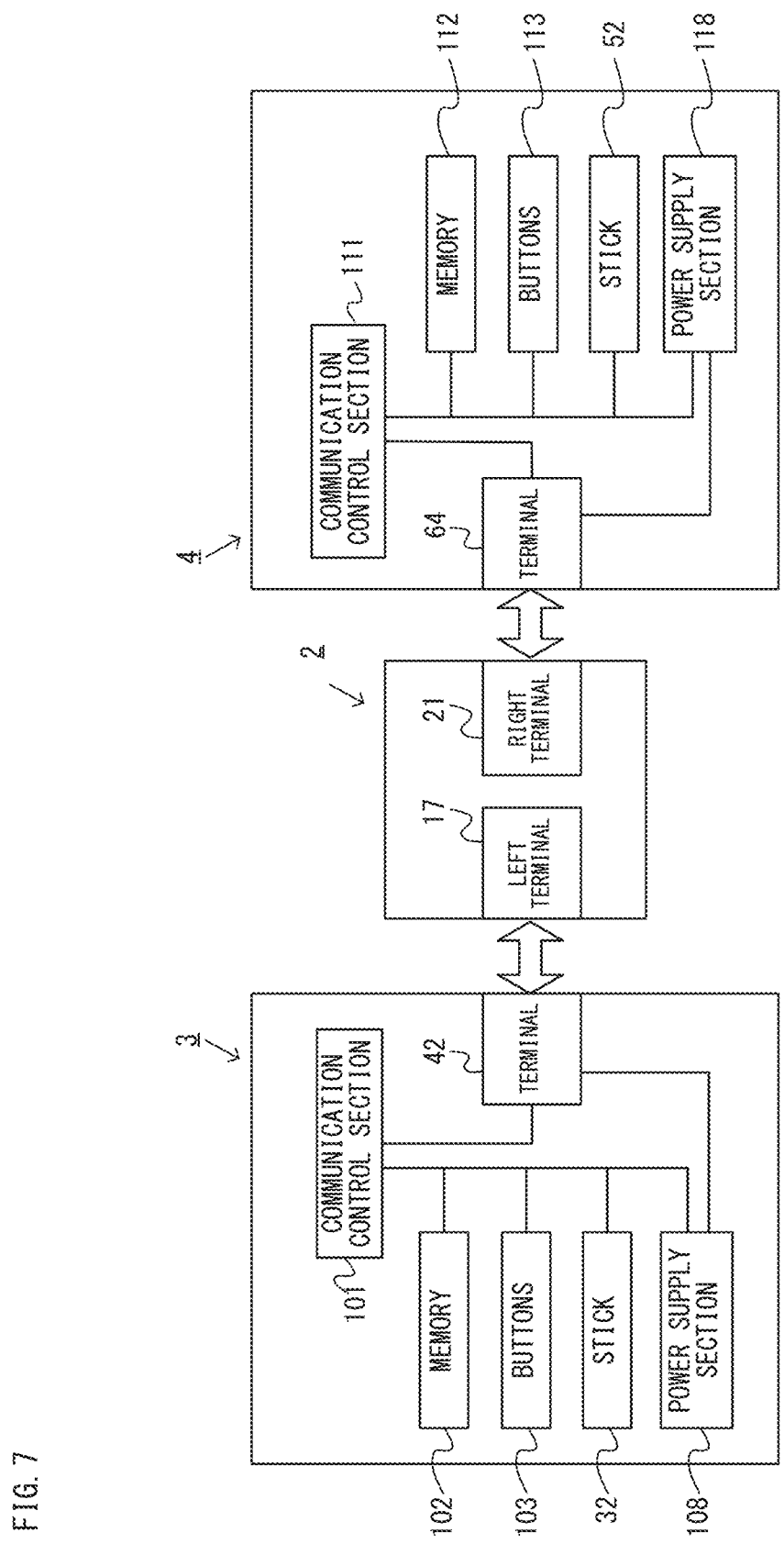
FIG. 7 is a block diagram showing non-limiting example internal configurations of the main body apparatus, the left controller and the right controller shown in FIG. 1 and FIG. 2.

FIG. 7 is a block diagram showing examples of internal configurations of the main body apparatus 2, the left controller 3 and the right controller 4. In addition, details of the internal configuration of the main body apparatus 2 are shown in FIG. 6 and thus are omitted in FIG. 7.

The left controller 3 comprises a communication control section 101 that performs communication with the main body apparatus 2. As shown in FIG. 7, the communication control section 101 is connected to components including the terminal 42. In the embodiment, the communication control section 101 can perform communication with the main body apparatus 2 through both wired communication via the terminal 42 and wireless communication not via the terminal 42. The communication control section 101 controls a method of performing communication by the left controller 3 with the main body apparatus 2. That is, when the left controller 3 is attached to the main body apparatus 2, the communication control section 101 performs communication with the main body apparatus 2 via the terminal 42. Moreover, when the left controller 3 is detached from the main body apparatus 2, the communication control section 101 performs wireless communication with the main body apparatus 2 (specifically, the controller communication section 83). The wireless communication between the communication control section 101 and the controller communication section 83 is performed in accordance with Bluetooth (registered trademark) standard, for example.

Moreover, the left controller 3 comprises a memory 102 such as a flash memory. The communication control section 101 is constituted by a microcomputer (also referred to as a microprocessor), for example, and executes firmware stored in the memory 102, thereby performing various processing.

The left controller 3 comprises buttons 103 (specifically, the buttons 33-39, 43, 44 and 47). Further, the left controller 3 comprises the analog stick (in FIG. 7, indicated as "stick") 32. The respective buttons 103 and the analog stick 32 outputs information regarding an operation performed to itself to the communication control section 101 repeatedly at appropriate timings.

The communication control section 101 acquires information regarding an input(s) (specifically, information regarding an operation or the detection results of the sensors) from respective input sections (specifically, the buttons 103, the analog stick 32 and the sensors 104 and 105). The communication control section 101 transmits operation data including the acquired information (or information obtained by performing predetermined processing on the acquired information) to the main body apparatus 2. In addition, the operation data is transmitted repeatedly, once every predetermined time period. In addition, the interval that the information regarding an input(s) is transmitted from each of the input sections to the main body apparatus 2 may or may not be the same.

The above-described operation data is transmitted to the main body apparatus 2, whereby the main body apparatus 2 can obtain an input(s) provided to the left controller 3. That is, the main body apparatus 2 can determine operations on the buttons 103 and the analog stick 32 based on the operation data.

The left controller 3 comprises a power supply section 108. In the embodiment, the power supply section 108 has a battery and a power control circuit. Although not shown, the power control circuit is connected to the battery and also connected to components of the left controller 3 (specifically, components that receive power supplied from the battery).

As shown in FIG. 7, the right controller 4 comprises a communication control section 111 that performs communication with the main body apparatus 2. Moreover, the right controller 4 comprises a memory 112 connected to the communication control section 111. The communication control section 111 is connected to components including the terminal 64. The communication control section 111 and the memory 112 have functions similar to those of the communication control section 101 and the memory 102, respectively, of the left controller 3. Therefore, the communication control section 111 can perform communication with the main body apparatus 2 through both wired communication via the terminal 64 and wireless communication not via the terminal 64 (specifically, communication in conformity with the Bluetooth (registered trademark) standard), and a method of communication to be performed with the main body apparatus 2 is controlled by the right controller 4.

The right controller 4 comprises input sections similar to the input sections of the left controller 3. Specifically, the right controller 4 comprises buttons 113 and the analog stick 52. These input sections have functions similar to those of the input sections of the left controller 3 and operate similarly to the input sections of the left controller 3.

The right controller 4 comprises a power supply section 118. The power supply section 118 has a function similar to the power supply section 108 of the left controller 3, and operates similarly to the power supply section 108.

Next, with reference to FIG. 8-FIG. 15, outlines of game processing of a main story of a virtual game and a rhythm game executed in the game system 1 of this embodiment will be described. The rhythm game is executable when satisfying a predetermined condition in the main story of the virtual game.

Figure 8:
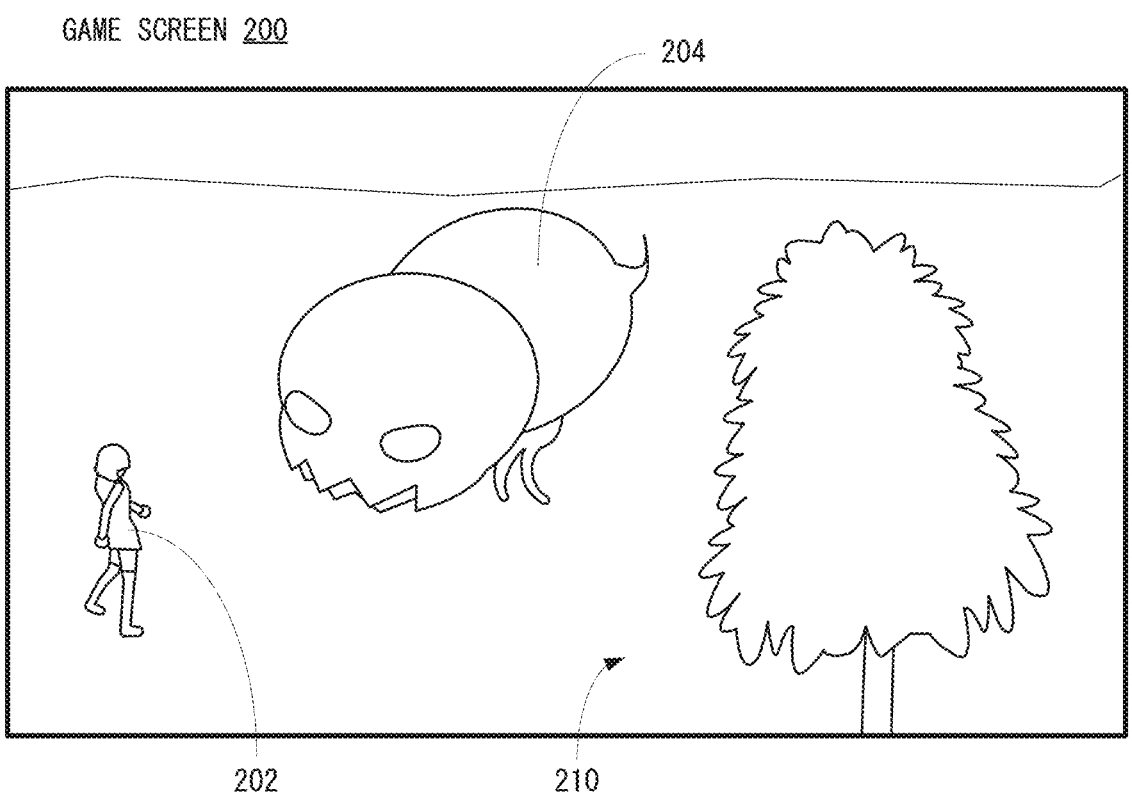
FIG. 8 is a view showing a non-limiting first example game screen of the embodiment.

FIG. 8 is a view showing a non-limiting example game image for the main story of the virtual game displayed on a display device (e.g., display 12) when executing an application of the virtual game of the embodiment.

The main body apparatus 2 functions also as an image processing apparatus, and generates display image data corresponding to various kinds of screens such as a game image, and outputs (displays). The processor 81 arranges various kinds of objects and characters in a three-dimensional virtual space, thereby to generate a certain sight or situation (scene). An image that this scene is imaged by a virtual camera (viewed from a viewpoint) is displayed on the display 12 as the game image.

Moreover, the main body apparatus 2 reproduces a musical piece, i.e., BGM, during a game of the main story of the virtual game. That is, the main body apparatus 2 outputs BGM data to the speaker 88 through the codec circuit 87. A plurality pieces of BGM data different with tempos and/or beats are prepared, and the BGM data to be reproduced according to a scene or an advancing situation of the virtual game is changed (or determined).

A game image shown in FIG. 8 is a non-limiting example game screen 200. The game screen 200 includes a player character 202, an enemy character 204, and a plurality of background objects 210. Moreover, an item and/or a non-player character may be included in the game screen 200.

The player character 202 is an object whose action or operation is controlled by a user or player (hereinafter, referred to as "player"). In the embodiment, the player character 202 is a main object imitating a human being. As the action or operation of the player character 202, in a certain virtual place, i.e., in a virtual space, moving, acquiring an item, using an item, attacking the enemy character 204, talking with a non-player character, etc. correspond. Moreover, in the embodiment, the item includes various objects, such as a tool (including arms and a protector) that the player character 202 uses or possesses, treasure and money.

Non-player character including the enemy character 204 is an object whose an action or operation is controlled by a computer (processor 81 of FIG. 6), not by the player. In the embodiment, the enemy character 204 is an object imitating an animal. Although illustration is omitted, the non-player character other than the enemy character 204 is an object imitating a human being other than the player character 202. Alternatively, the non-player character other than the enemy character 204 is an object imitating an animal other than the enemy character 204. As the action or operation of the enemy character 204, in the virtual space, moving, attacking the player character 202, etc. correspond. As the operation or operation of the non-player characters other than the enemy character 204, in the virtual space, moving, talking with the player character 202, passing an item to the player character 202, etc. correspond.

The background object 210 includes a terrain object arranged in the virtual space. In the embodiment, the terrain includes ground (including roads, land, flower gardens, farmland, etc.), slopes, floors, trees, grass, flowers, buildings, stairs, bridges, water surface (including rivers, ponds, lakes, seas, etc.), holes, caves, cliffs, pillars, walls, fences, bars, etc.

In the embodiment, the player moves the player character 202 in the virtual space, defeating the enemy character 204, acquiring an item, using an item, solving a trick provided in the virtual space, thereby to advance the main story of the virtual game. If the player character 202 defeats a boss (last) enemy character 204, the game is cleared.

As an example, the player character 202 is moved in a direction that the analog stick 32 is tilted. Moreover, if the ZL button 39 is operated, a magic circle 220 appears in a direction that the player character 202 faces. Moreover, if the analog stick 32 is tilted while the ZL button 39 is being operated, the player character 202 is moved with making the magic circle 220 appear, and in that case, the magic circle 220 is located in front of the player character 202, and moved according to a movement of the player character 202.

Furthermore, if the ZL button 39 is operated when a predetermined flower object 210a is being arranged near the player character 202, the magic circle 220 is made to appear in a direction that the player character 202 faces, and a rhythm game will be started. The rhythm game is continued during the ZL button 39 is being operated. The rhythm game is ended if an operation of the ZL button 39 is stopped. This is an example, and if the ZL button 39 is operated, the rhythm game may be started, and if the ZL button 39 is operated again, the rhythm game may be ended.

Figure 9:
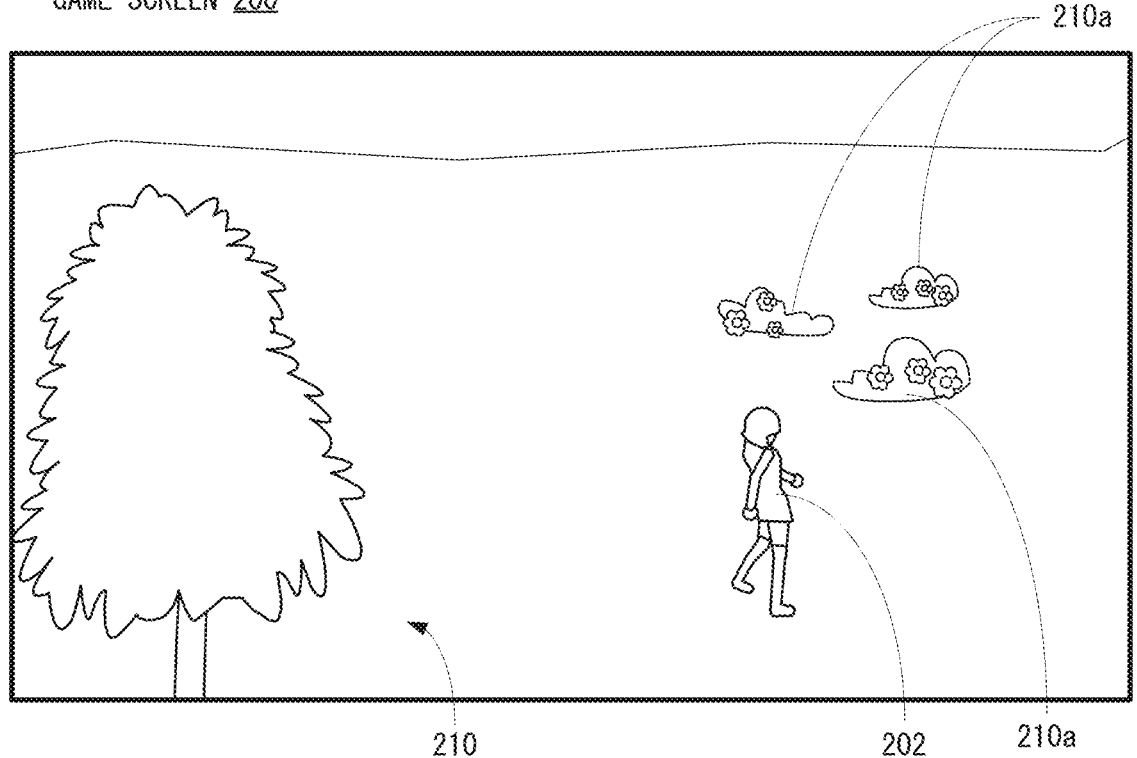
FIG. 9 is a view showing a non-limiting second example game screen of the embodiment.

A game image shown in FIG. 9 is another non-limiting example game screen 200. The game screen 200 shown in FIG. 9 shows a state that the player character 202 is moved in the virtual space in the game screen 200 shown in FIG. 8, and arrives at a place where the predetermined object is arranged. The predetermined object is a predetermined background object 210, and as an example, may be an object of a predetermined flower (flower object) 210a. In another example, the predetermined object may be an object for an item such as a predetermined jewel or mirror. Moreover, in other examples, the predetermined object may be the ground object on which a predetermined symbol and/or figure are indicated, i.e., a portion of the background object 210. Moreover, the predetermined object may be a predetermined enemy character 204.

As described above, when a distance between the player character 202 and the predetermined flower object 210a is equal to or less than a predetermined distance, if the player operates the ZL button 39 in a state that the player character 202 is turned to a direction of this flower object 210a, the player character 202 is made to perform an action or operation to produce the magic circle 220 in front of the player character 202, and when the magic circle 220 appears, the rhythm game of the embodiment will be started. Alternatively, in a case where the player character 202 is moved in a state that the magic circle 220 is produced by operating the ZL button 39 and the analog stick 32 by the player, the rhythm game is started when the magic circle 220 is overlapped with the predetermined flower object 210a or approaches within a predetermined distance therewith.

However, the direction of the predetermined flower object 210a may be not only a direction that the predetermined flower object 210a located strictly but also a direction relative to a predetermined range including the predetermined flower object 210a.

Figure 10:
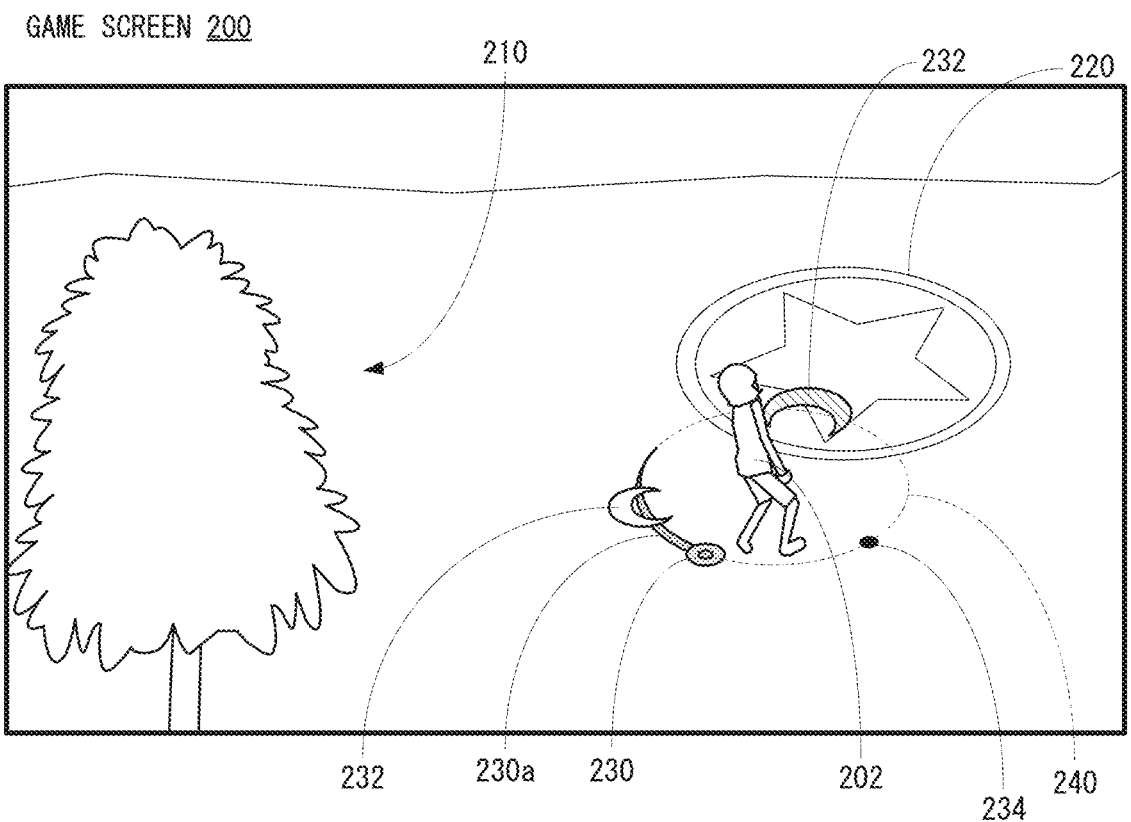
FIG. 10 is a view showing a non-limiting third example game screen of the embodiment.
Figure 11:
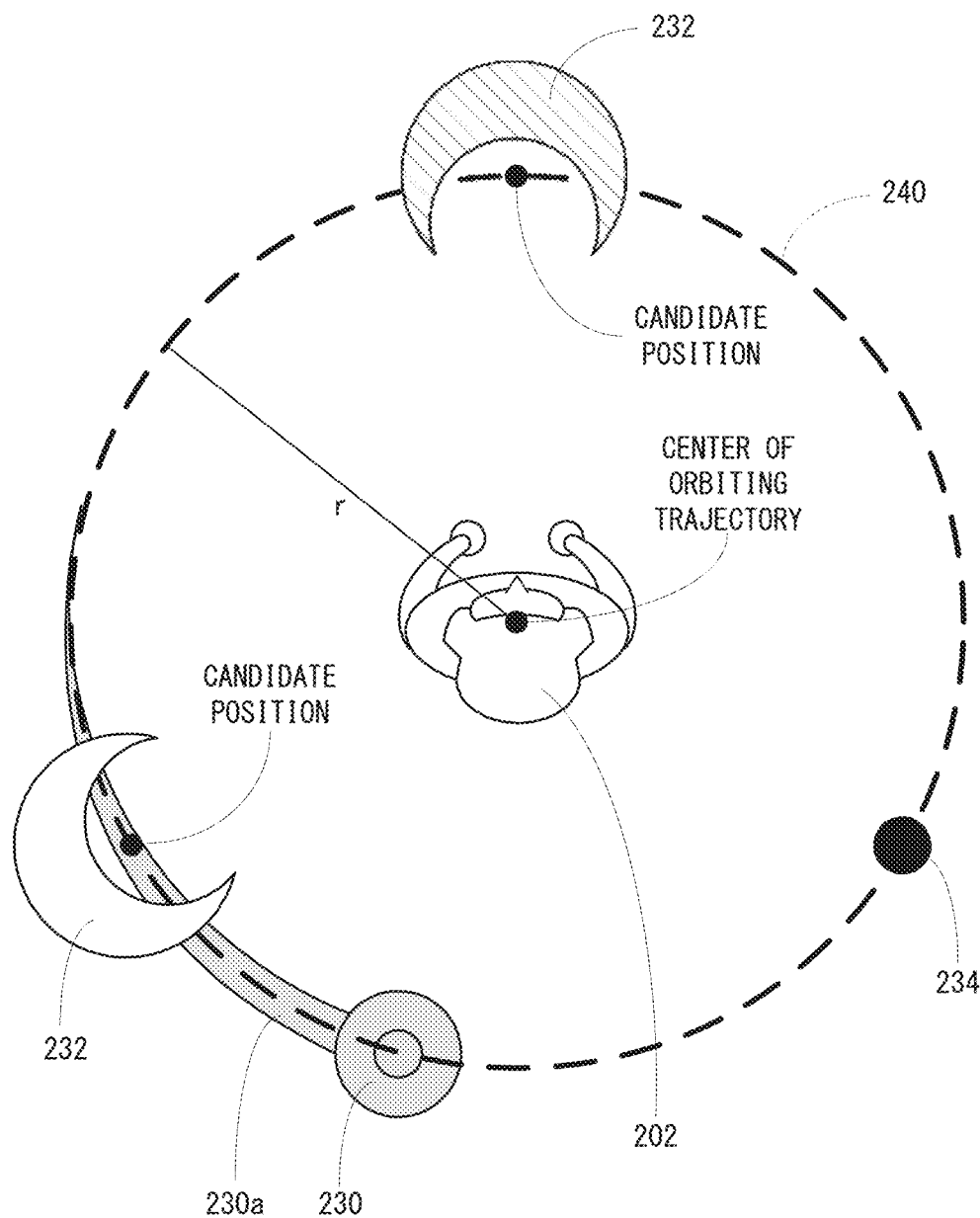
FIG. 11 is a view showing a non-limiting example positional relationship of a player character, a first marker, two second markers and a third marker shown in FIG. 10, viewed from right above of a virtual space.

A game image shown in FIG. 10 is another non-limiting example game screen 200. FIG. 11 shows a non-limiting example positional relationship of the player character 202, a first marker 230, second markers 232 and a third marker 234 shown in FIG. 10, viewed from right above of the virtual space. However, in FIG. 11, the player character 202, the first marker 230, the second markers 232, the third marker 234, an orbiting trajectory 240 and candidate positions are shown so that a direction of the player character 202 becomes upward. The same applies to FIG. 12.

In the game screen 200 shown in FIG. 10 is a non-limiting example state that it is instructed to start the rhythm game in the game screen 200 shown in FIG. 9 and a little time elapse after the rhythm game is started. Moreover, although the magic circle 220 is displayed instead of the predetermined flower object 210a in the game screen 200 shown in FIG. 10, the magic circle 220 may be displayed to be overlapped on the predetermined flower object 210a.

Moreover, as shown in FIG. 10 and FIG. 11, in the game screen 200, the first marker 230 is moved around the player character 202 along the orbiting trajectory 240 (or on the orbiting trajectory 240). In the embodiment, the orbiting trajectory 240 is a circle of a predetermined size, and the center of the orbiting trajectory 240 is set to a position that is overlapped with the position of the player character 202. The position of the player character 202 is the center of the body of the player character 202 and the position of the feet of the player character 202. Moreover, a position of a height direction of the orbiting trajectory 240 is set to the position of the waist of the player character 202.

However, the center of the orbiting trajectory 240 may be set as a position in front of the player character 202 (e.g., a position ahead by a distance half the radius r of the circle of orbiting trajectory 240). By setting the center of the orbiting trajectory 240 to such a position, it is possible to prevent the second marker 232 arranged in front of the player character 202 from being difficult to be seen even in a case where the game image that the virtual space is viewed from the diagonally rear of the player character 202 is displayed as shown in FIG. 10.

The first marker 230 is an object of a circular indicated by a double circle, and is moved counterclockwise. In the embodiment, an object of a tail (hereinafter, simply referred to as "tail") 230a is added to the first marker 230. The tail 230a is added in order to show intelligibly a moving direction of the first marker 230 (or orbiting direction). Moreover, by adding the tail 230a, even if the first marker 230 is hidden behind the player character 202 or the like, an approximate position of the first marker 230 can be grasped. However, the tail 230a may not be added to the first marker 230. Moreover, the tail 230a may be displayed not as an object but as a mere effect. Furthermore, as for the tail 230a, a length and/or shape may be changed according to the tempo of the BGM.

In addition, although the orbiting trajectory 240 is drawn by a dotted line in FIG. 10 and FIG. 11, the orbiting trajectory 240 is not displayed in the game screen 200 of an actual. The same applies to other drawings.

Moreover, on the orbiting trajectory 240, a plurality of (in FIG. 10 and FIG. 11, two) second markers 232 are displayed, and a single third marker 234 is displayed. The second marker 232 and the third marker 234 are markers (hereinafter, may be referred to "rhythm marker") indicating positions that the beats are ticked in the BGM that is reproduced during the rhythm game. The BGM reproduced in the rhythm game may be a BGM reproduced in the main story. That is, the BGM reproduced in the main story is also continuously reproduced during the rhythm game. Moreover, it is possible to reproduce another BGM at the same tempo as the BGM reproduced in the main story. For example, another BGM may be a BGM that is modified into a piano version or the like from the BGM in an orchestra version reproduced in the main story. Therefore, it is possible to start smoothly the rhythm game from the main story of the virtual game.

In the rhythm game of the embodiment, the player operates the analog stick 32 to be tilted in a direction that the second marker 232 is arranged from the center of the orbiting trajectory 240 at a timing that the first marker 230 that is moved on the orbiting trajectory 240 arrives at the position that the second marker 232 is arranged. A plurality of second markers 232 may be arranged on the orbiting trajectory 240, and the second marker 232 that is an operating target is the second marker 232 that the first marker 230 arrives at (or is overlapped with) next.

Moreover, the second marker 232 also indicates a position that determines a success or failure of a tilting operation of the player. The third marker 234 indicates a position that does not determine a success or failure of a tilting operation of the player. The second marker 232 is an object of a shape that a circle or disk is partly eroded (e.g., shape such as a crescent moon), and it is arranged so that the center thereof is overlapped on the orbiting trajectory 240 when assuming a circular shape. The third marker 234 is an object of a black circle (or black dot), and is arranged so that the center of the black circle is overlapped with the orbiting trajectory 240.

One round of the orbiting trajectory 240 corresponds to one bar, and the number of candidate positions that the second marker 232 is arranged is determined according to the beat of the BGM, each of the candidate positions being determined on the orbiting trajectory 240. The number of candidate positions is the number of beats in one bar. Moreover, in the embodiment, since the second marker 232 is displayed in front of the player character 202, a reference candidate position is determined in a direction that the player character 202 faces at the time of starting the rhythm game is instructed. Other candidate positions are determined based on the reference candidate position.

Since the number of beats in one bar is three when the BGM is of three-quarter time, three candidate positions are determined on the orbiting trajectory 240 so that intervals between the reference candidate position and the other two candidate positions become equal, that is, a central angle of two adjacent candidate positions becomes 120 degrees. Similarly, since the number of beats in one bar is four when the BGM is of four-quarter time, four candidate positions are determined on the orbiting trajectory 240 so that intervals between the reference candidate position and the other three candidate positions become equal, that is, the central angle of two adjacent candidate positions becomes 90 degrees. As for other BGMs of the number of beats, the number of the candidate positions and respective candidate positions are similarly determined on the orbiting trajectory 240.

However, the number of candidate positions may be determined according to difficulty that is set in advance to for each player or a progress degree of the virtual game. Moreover, a lottery probability for the number of the candidate positions may be determined according to the difficulty or the advancing degree, and the number of the candidate positions may be determined according to the lottery probability.

The number of the second markers 232 to be arranged is determined at random with a maximum value according to the number of the candidate positions. Moreover, one of the one or more second markers 232 to be arranged is arranged at the reference candidate position. Remaining second markers 232 are arranged at random at candidate positions other than the reference candidate position. However, when the number of the second markers 232 to be arranges is corresponding to the number of the candidate positions, each of the second markers 232 is arranged at each of the candidate positions. The third marker 234 is arranged at each of the one or more candidate positions that the second marker 232 is not arranged. Moreover, the second marker 232 to be arranged at the reference candidate position is the second marker 232 at an end point that indicates a position that the beat is ticked at the last in one bar (hereinafter, referred to as "end marker 232").

Thus, in the rhythm game, since the number of the second markers 232 to be arranged is determined according to the beat of the BGM that is reproduced in the main story of the virtual game, the player can shift to the rhythm game without discomfort.

Figure 12:
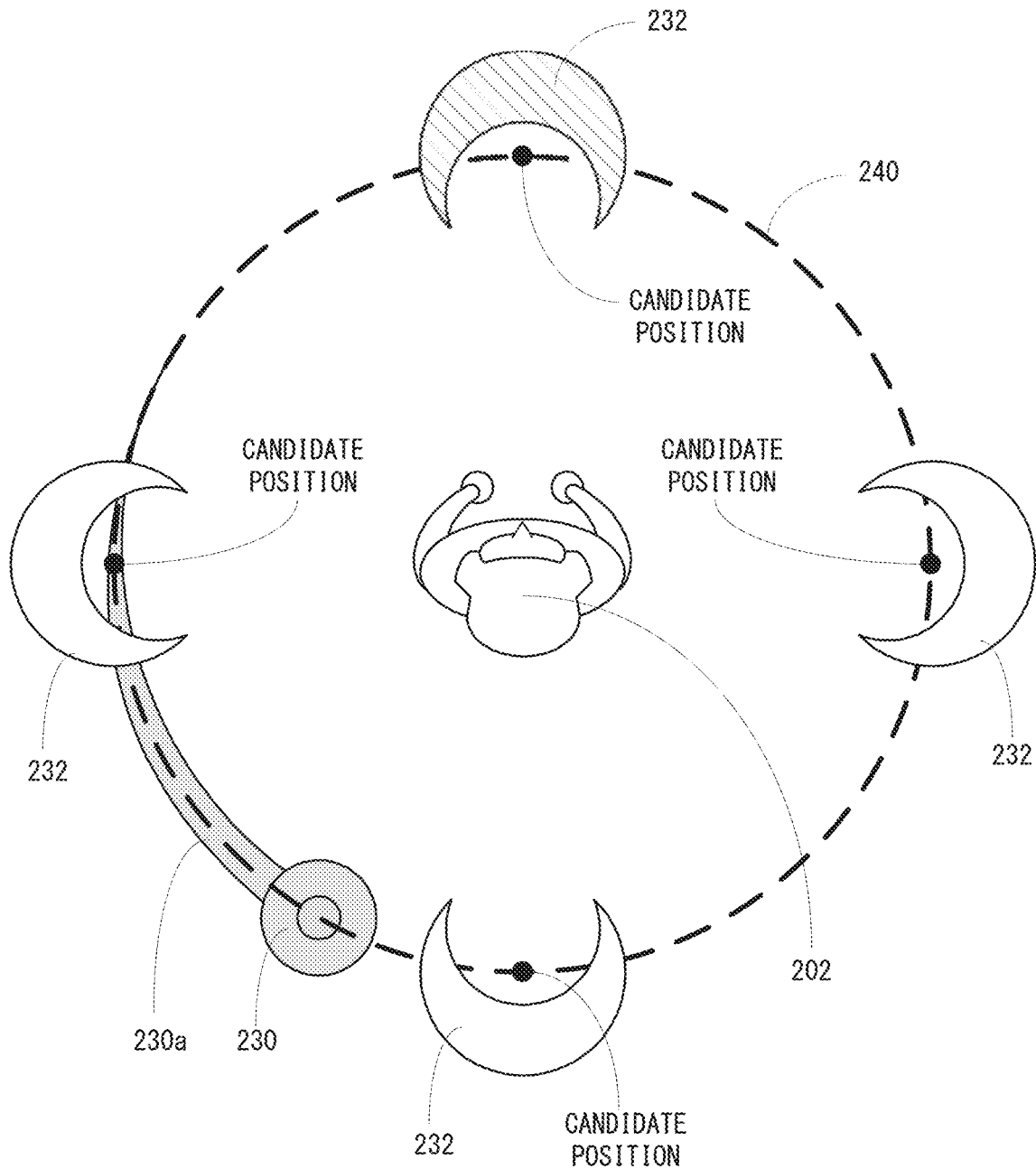
FIG. 12 is a view showing a non-limiting example positional relationship of a player character, a first marker and four second markers, viewed from right above of the virtual space.

FIG. 12 shows a non-limiting example positional relationship of the player character 202, the first marker 230 and four second marker 232, viewed from right above of the virtual space. In an example of FIG. 12, the BGM is four-quarter time and thus four second markers 232 are arranged. As described above, in case of four-quarter time, four candidate positions are determined on the orbiting trajectory 240 with intervals of 90 degrees. However, the reference candidate position is determined to the direction of the player character 202. In addition, in the example shown in FIG. 12, since the second marker 232 is arranged at each of all the candidate positions, the third marker 234 is not arranged.

Figure 13:
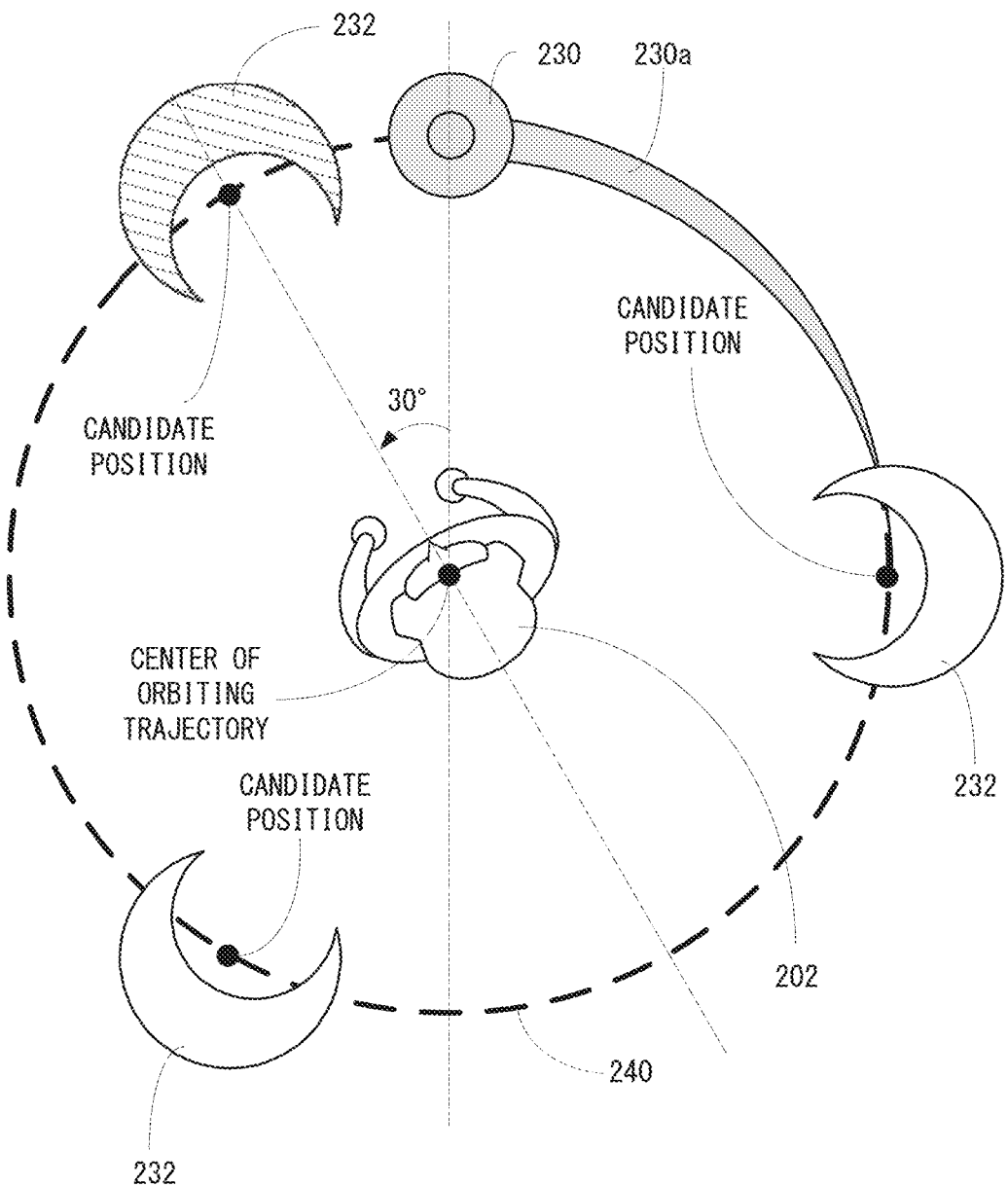
FIG. 13 is a view showing a non-limiting example positional relationship of a player character, a first marker and three second markers, viewed from right above of the virtual space.

As described above, the reference candidate position is set in the direction of the player character 202 at the time of starting the rhythm game is instructed, and the end marker 232 is arranged at the reference candidate position. Therefore, as shown in FIG. 13, in a case where the direction of the player character 202 is different from the direction shown in FIG. 11 and FIG. 12, the position of the end point marker 232 also differs. Similarly, the positions of other rhythm markers also differ. In an example shown in FIG. 13, the player character 202 faces to a direction rotated by 30 degrees to the left from the direction shown in FIG. 11 and FIG. 12. Therefore, the reference candidate position is also determined on a position rotated by 30 degrees to the left (counterclockwise) from the cases shown in FIG. 11 and FIG. 12, and the end point marker 232 is arranged at this reference candidate position. In FIG. 13, unlike the cases shown in FIG. 11 and FIG. 12, the second marker 232 is arranged at each of three candidate positions.

Thus, since one or more second markers 232 are arranged according to the direction of the player character 202 that produces the magic circle 220, it is possible for the player to start the rhythm game at an arbitrary timing and at a position that is easy to see and easy to operate.

Moreover, since a direction of a tilting operation with respect to the end point marker 232 is a direction that the player character 202 faces, it can also start the rhythm game at an arbitrary timing and at a position that is easy to see and easy to operate for the player.

Furthermore, in the embodiment, the player performs the tilting operation of the analog stick 32 to designate the second marker 232 arranged at the candidate position. When designating a direction by a tilting operation of the analog stick 32, it is difficult to discriminate a direction, and therefore, three candidate positions or four candidate positions are set on the orbiting trajectory 240 with constant intervals as shown FIG. 11 and FIG. 12. In order to make this discrimination easy to perform, four candidate positions are arranged at the maximum, and the central angle of two adjacent candidate positions is made to be equal to or larger than 90 degrees.

Moreover, a moving speed of the first marker 230 is determined based on the tempo and the beat of the BGM that is reproduced during the rhythm game. The tempo and the beat of the BGM are automatically analyzed by general-purpose middleware, and are output. For example, when the tempo of the BGM is 60, a quarter note is inscribed 60 times in one minute. Therefore, when this BGM is three-quarter time, a length of one bar is three seconds. Moreover, when this BGM is four-quarter time, a length in one bar is four seconds. Therefore, when assuming that a length of the orbiting trajectory 240 is L (m) in the virtual space, if the tempo of the BGM is 60 and this BGM is of three-quarter time, the moving speed v of the first marker 230 is L/3 (m/s). Similarly, when the tempo of the BGM is 60 and this BGM is of four-quarter time, the moving speed v of the first marker 230 is L/4 (m/s). However, the length L of the orbiting trajectory 240 is $2\pi r$ when the radius of the circle of the orbiting trajectory 240 is set to r. Here, $\pi$ is number pi (circle ratio).

Thus, since the moving speed v of the first marker 230 is determined according to the tempo of the BGM, the player can shift to the rhythm game from the main story of the virtual game without discomfort.

In addition, if the same beat, as compared with a case where the tempo is 60, when the tempo is 80, the moving speed v becomes 4/3 times, and when the tempo is 120, as compared with a case where the tempo is 60, the moving speed v becomes twice.

The first marker 230 starts moving when the rhythm game is started, and during the rhythm game, and continues to move counterclockwise along the orbiting trajectory 240 at the moving speed v calculated based on the tempo of the BGM. However, the first marker 230 starts moving from a position on the orbiting trajectory 240 corresponding to a reproducing position of the BGM in one bar. The reproducing position of the BGM in one bar is automatically analyzed by the general-purpose middleware described above. That is, the first marker 230 starts moving from a position that is advanced counterclockwise from the reference candidate position by a length obtained by multiplying the length L of the orbiting trajectory 240 by the ratio of the time from the beginning of one bar to the reproducing position with respect to the time of one bar of the BGM (i.e., length of time). In addition, the reproducing position of the BGM in one bar may be specified by another method.

Moreover, since the player starts the rhythm game at an arbitrary timing as described above, the first marker 230 and the second marker 232 are displayed on the game screen 200 at predetermined timings, respectively. In the embodiment, the first marker 230 is displayed at a timing of starting the moving, i.e., at a timing of being arranged on the orbiting trajectory 240 when a position to start the moving is between the reference candidate position (i.e., a position that the last beat is ticked in immediately before bar) and the first beat candidate position in the current bar. Moreover, the first marker 230 is displayed at a position that the last beat is ticked in the current bar, i.e., at a timing that is overlapped with the reference candidate position when a position to start the moving exceeds the candidate position of the first beat in the current bar.

Moreover, the second marker 232 is displayed at a timing that the position of the first marker 230 is overlapped with the reference candidate position after the first marker 230 is displayed. Therefore, in the embodiment, during a time until the second marker 232 is displayed after the rhythm game is started, the third marker 234 is arranged on the orbiting trajectory 240 at each of all the candidate positions.

Therefore, the player waits to start playing the rhythm game until the second marker 232 is displayed after the rhythm game is started, and if the first marker 230 is displayed, the player recognizes a timing that the first marker 230 and the third marker 234 are overlapped with each other by the game image and the game sound. Thereby, the player measures a timing for operation.

Thus, in the rhythm game, the first marker 230 is moved on the orbiting trajectory 240, and the reference candidate position is a position that the first marker 230 is started to move in one bar, and therefore, as described above, it is possible also to say that the end point marker 232 arranged at the reference candidate position is the second marker 232 that is set in the first order.

Moreover, although a position that the displaying of the first marker 230 is started is the reference candidate position, as an example, a position other than reference candidate position may be set.

Moreover, in the embodiment, in order to distinguish the second marker 232 arranged at the reference candidate position, i.e., the end point marker 232 from the second marker 232 arranged at the candidate position other than the reference candidate position, the end point marker 232 is added with slant lines. Therefore, even when the first marker 230 is moved along the orbiting trajectory 240 round and round, depending on a display manner of the second marker 232, not only it is possible to easily know which second marker 232 is to be operated at the end in one bar but also it is possible to easily discriminate which second marker 232 is to be operated at the first in one bar. However, in the game screen 200 in actual, a pattern may be added only to the end point marker 232, a color different from colors of the other second marker 232 may be added to the end point marker 232, or the end point marker 232 may be displayed with a different shape and/or size from those of the other second markers 232. That is, the end point marker 232 has a visual feature different from the other second marker 232.

Furthermore, in the embodiment, in order to notify to the player a position that the rhythm or beats of the BGM is ticked and a position that the player should operate, when the first marker 230 arrives at the position that the rhythm marker is arranged, a sound effect is output (or reproduced) separately from the BGM. That is, a sound effect is generated when the position of the first marker 230 is overlapped with the position of the rhythm marker. A predetermined sound effect (hereinafter, referred to as "first sound effect") is output at the position that the second marker 232 other than the end point marker 232 is arranged and at the position that the third marker 234 is arranged, and the position the end point marker 232 is arranged, a predetermined sound effect (hereinafter, referred to as "second sound effect") different from the first sound effect is output. Moreover, the second sound effect is set to a higher pitch sound than the first sound effect, as an example, but the second sound effect may be set to a lower pitch sound than the first sound effect, or the second sound effect may be set to a different volume with the same pitch as the first sound effect. However, a position that the rhythm marker, i.e., the second marker 232 or the third marker 234 is arranged is the candidate position. The same applies below.

Thus, since the first sound effect and the second sound effect are output, it is possible to know the position of the end point marker 232 by the difference in a tone. Therefore, it is possible for the player to easily discriminate which rhythm marker is the first beat dependent on the feature of the sound effect.

However, different sound effects may be output between the position that the second marker 232 other than the end point marker 232 is arranged and the position that the third marker 234 is arranged. In this case, a third sound effect that is different from the first sound effect and the second sound effect is output on the position that the third marker 234 is arranged. Moreover, the third sound effect may be set to a lower pitch sound than the first sound effect and the second sound effect. Thus, if the first sound effect, the second sound effect and the third sound effect are output, it is possible to know the position of the end point marker 232 as well as the position of the second marker 232 that the tilting operation should be performed.

The player tilts the analog stick 32 (hereinafter, may be referred to as "L stick") to designate the position (or direction) that the second marker 232 is arranged at a timing that the first marker 230 arrives at the position that the second marker 232 is arranged. As described above, a success or failure of the tilting operation of the player is determined for each of the positions that the second marker 232 are arranged.

Moreover, if it is determined that all the tilting operations of the player respect to one or more second markers 232 are in success during the first marker 230 is moved on the orbiting trajectory 240 one round, it is determined that the tilting operation of the player for that round is in success. On the other hands, if it is determined even once that the tilting operation of the player respect to one or more second markers 232 is in failure during the first marker 230 is moved on the orbiting trajectory 240 one round, it is determined that the tilting operation of the player for that round is in failure. Hereinafter, a game that the player performs the tilting operation during the first marker 230 is moved on the orbiting trajectory 240 one round in the rhythm game is referred to as "small rhythm game". Therefore, if it is determined that all the tilting operations of the player respect to one or more second markers 232 are in success during the first marker 230 is moved on the orbiting trajectory 240 one round, it becomes a success (or clear) of the small rhythm game. Moreover, if it is determined even once that the tilting operation is in failure, it becomes a failure of the small rhythm game.

In the embodiment, if the small rhythm game is in success, the number of the second markers to be arranged and the positions at which one or more second markers 232 are arranged are changed at random. That is, one or more second markers 232 that are determined at random are rearranged at random. A method of determining the number of the second markers 232 to be arranged and a method of determining the positions that one or more second markers 232 are the same as the methods at the time of the start of the rhythm game, respectively. If the small rhythm game is in failure, the second marker 232 is not rearranged.

Thus, in the embodiment, when the rhythm game is continued, even if the second marker 232 is arranged in a next small rhythm game at the position that the second marker 232 is not arranged in the small rhythm game that is succeeded at this time, the BGM is not changed and thus the multiple candidate positions are fixed, the player can take a rhythm with the sound effects. Therefore, it is easy for the player to operate the rhythm game.

If the small rhythm game is in success in a predetermined number of times (in the embodiment, three times), a predetermined effect is activated. In the below, a set of the small rhythm games is referred to as a large rhythm game that is determined as clear when the small rhythm game is in success by a predetermined number of times, and then, the predetermined effect is activated.

However, the predetermined number of times may be one time, two times, or four or more times. Moreover, a plurality of consecutive number of times may be sufficient as the predetermined number of times. The predetermined number of times may be determined in advance, or determined at random according to the degree of difficulty or the progress degree of the virtual game at the time of starting the rhythm game.

As described above, the rhythm game is continued while the ZL button 39 is being operated. That is, when the player continues to operate the ZL button 39 until the player clears the large rhythm game, the large rhythm game is continued.

If the predetermined effect is activated, a hit point (HP) of the player is recovered wholly or by a predetermined value, the player or the player character obtains a predetermined number of coins, or a predetermined trick provided in the virtual space is solved. When a predetermined trick is solved, a hidden door or a dungeon appears, a door is unlocked, a drawbridge is descended, or a rock that blocks a course disappears.

In the embodiment, if the large rhythm game is cleared, a predetermined effect is activated, and the large rhythm game, i.e., the rhythm game control processing is ended. Then, the first marker 230 and all the rhythm markers are eliminated, and the game screen 200 representing the predetermined effect having been activated is displayed on the display 12.

In the embodiment, the large rhythm game is cleared when the small rhythm game is successfully cleared in the predetermined number of times, and the predetermined effect is activated as an opportunity to the clear of the large rhythm game, but the predetermined effect may be activated as an opportunity to determination that the small rhythm game is successfully cleared.

Here, a method of determining whether a success or failure of the tilting operation of the player with respect to the second marker 232 will be described. In the embodiment, it is determined whether the first marker 230 indicates a direction from the center of the orbiting trajectory 240 to a position that the second marker 232 is arranged at a timing that the first marker 230 arrives at the position that the second marker 232 is arranged. That is, a success or failure of the tilting operation of the player is determined based on a success or failure of a timing that the analog stick 32 is tilted and a success or failure of a direction that the analog stick 32 is tilted. If both the timing and the direction that the analog stick 32 is tilted are in success, it is determined that the tilting operation by the player with respect to the second marker 232 is in success. If the timing and/or the direction are in failure, it is determined that the tilting operation by the player with respect to the second marker 232 is in failure.

A method of determining a success or failure of the timing that the analog stick 32 is tilted and a method of determining a success or failure of the direction that the analog stick 32 is tilted.

In a case where the timing of tilting the analog stick 32 is within a fixed period or range (hereinafter, referred to as "timing determination range") that includes an exact timing that the position of the first marker 230 arrives at the position that the second marker 232 is arranged, it is determined that the timing of tilting the analog stick 32 is in success. However, the timing determination range is started 0.3 seconds before the exact timing that the position of the first marker 230 arrives at the position that the second marker 232 is arranged and ended 0.5 seconds after the exact timing.

However, the timing determination range may have the same length before and after centering on the exact timing, or the length before the exact timing longer than the length after the exact timing.

A length of the timing determination range is fixed, and the second marker 232 is set on all or a part of the multiple candidate positions that are determined by the beat of the BGM, and therefore, when the multiple candidate positions are determined, the timing determination range is determined with respect to each of the candidate positions. However, the time that the beat is ticked at each candidate position is determined by the tempo.

Figure 14A:
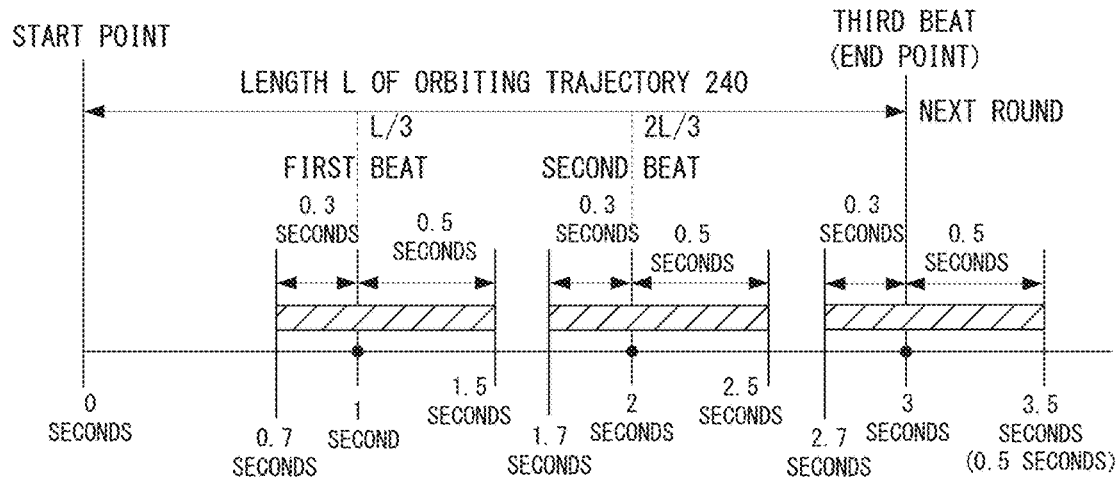
FIG. 14A is a view showing a non-limiting example timing determination range for each candidate position, i.e., for each beat in a case where a BGM that is three-quarter time and a tempo of 60.
Figure 14B:
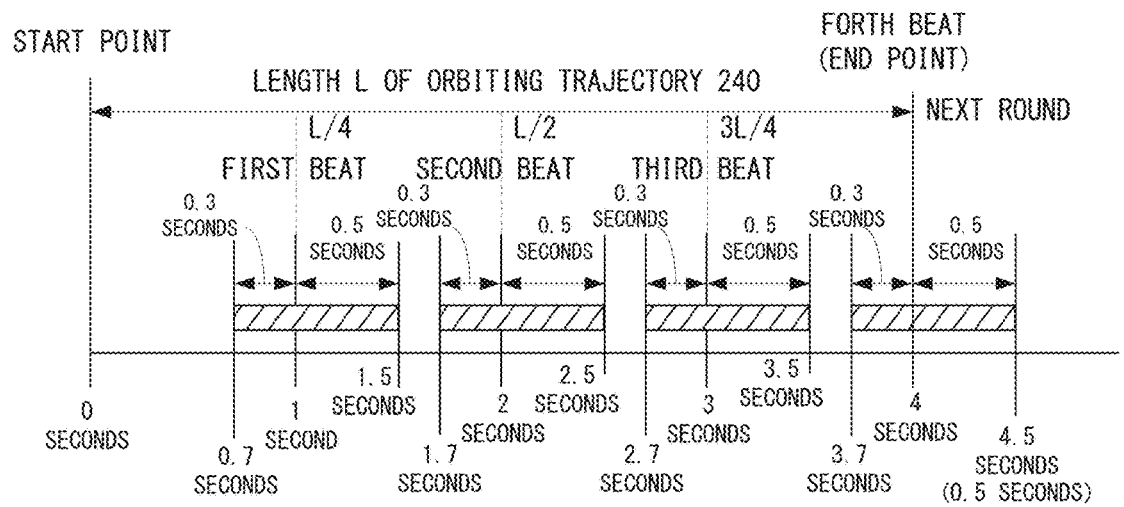
FIG. 14B is a view showing a non-limiting example timing determination range for each candidate position, i.e., for each beat in a case where a BGM that is four-quarter time and a tempo of 60.
Figure 14C:
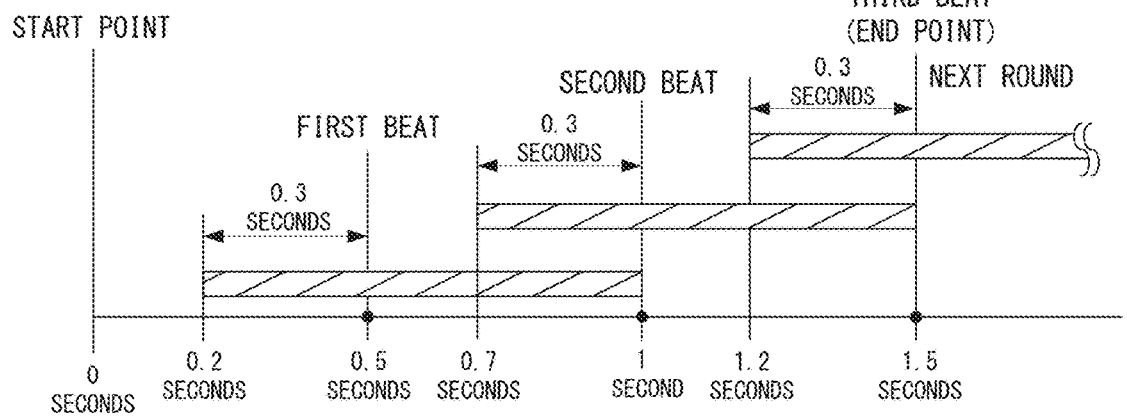
FIG. 14C is a view showing a non-limiting example timing determination range for each candidate position, i.e., for each beat in a case where a BGM that is three-quarter time and a tempo of 120.

FIG. 14A is a view showing a non-limiting example timing determination range for each candidate position, i.e., for each beat in a case where a BGM that is of three-quarter time with a tempo is 60. FIG. 14B is a view showing a non-limiting example timing determination range for each candidate position, i.e., for each beat in a case where a BGM that is of four-quarter time and a tempo is 60. FIG. 14C is a view showing a non-limiting example timing determination range for each candidate position, i.e., for each beat in a case where a BGM that is of three-quarter time and a tempo is 120.

As described above, when the BGM is of three-quarter time and the tempo is 60, three candidate positions are arranged at equal intervals on the orbiting trajectory 240. If the orbiting trajectory 240 is indicated in a straight line as shown in FIG. 14A, three candidate positions are arranged at positions of length L/3 (m), length 2L/3 (m) and length L (m) each from the start point, respectively. Moreover, the three candidate positions are positions that the first beat, the second beat and the third beat are ticked in an order toward the end point from the start point.

When the BGM is of three-quarter time and the tempo is 60, since the beat is ticked for each second, the timing determination range of 0.7-1.5 seconds is set with respect to the candidate position of the first beat, the timing determination range of 1.7-2.5 seconds is set with respect to the candidate position of the second beat, and the timing determination range of 2.7-3.5 seconds is set with respect to the candidate position of the third beat. However, since a timer 854x (see FIG. 17) is reset and started for each time that the first marker 230 is moved on the orbiting trajectory 240 one round as described later, the timing determination range with respect to the candidate position of the third beat is a time period of 2.7-3.0 seconds and 0-0.5 seconds in a next round. The same applies to other cases.

When the tilting operation of the analog stick 32 is performed in each timing determination range, it is determined that the timing of tilting the analog stick 32 is in success. When the timing that the tilting operation of the analog stick 32 is performed before each timing determination range and when no tilting operation of the analog stick 32 is performed within each timing determination range, it is determined that the timing of tilting the analog stick 32 is in failure. These are the same for other cases.

As described above, when the BGM is four-quarter time and the tempo is 60, four candidate positions are arranged on the orbiting trajectory 240 at equal intervals. If the orbiting trajectory 240 is indicated in a straight line as shown in FIG. 14B, the four candidate positions are arranged at positions of length L/4 (m), length L/2 (m), length 3L/4 (m) and length L (m) each from the start point, respectively. Moreover, the four candidate positions are positions that the first beat, the second beat, the third beat and the fourth beat are ticked in an order toward the end point from the start point.

When the BGM is of four-quarter time and the tempo is 60, since the beat is ticked for each second, the timing determination range of 0.7-1.5 seconds is set with respect to the candidate position of the first beat, the timing determination range of 1.7-2.5 seconds is set with respect to the candidate position of the second beat, the timing determination range of 2.7-3.5 seconds is set with respect to the candidate position of the third beat and the timing determination range of 3.7-4.5 seconds is set with respect to the candidate position of the fourth beat. However, the timing determination range with respect to the candidate position of the fourth beat is a time period of 3.7-4.0 seconds and 0-0.5 seconds in a next round.

Moreover, as well as a case where the tempo is 60, in a case where the BGM is of three-quarter time and a tempo is 120, three candidate positions are arranged at equal intervals on the orbiting trajectory 240. If the orbiting trajectory 240 is indicated in a straight line as shown in FIG. 14C, the three candidate positions are arranged at positions of length L/3 (m), length 2L/3 (m) and length L (m) each from the start point, respectively. Moreover, the three candidate positions are positions that the first beat, the second beat and the third beat are ticked in an order toward the end point from the start point.

When the BGM is of three-quarter time and a tempo is 120, since the beat is ticked for each 0.5 seconds, the timing determination range of 0.2-1.0 seconds is set with respect to the candidate position of the first beat, the timing determination range of 0.7-1.5 seconds is set with respect to the candidate position of the second beat and the timing determination range of 1.2-2.0 seconds is set with respect to the candidate position of the third beat. However, the timing determination range with respect to the candidate position of the third beat is a time period of 1.2-1.5 seconds and 0-0.5 seconds in a next round.

In the embodiment, since the length of the timing determination range is fixed, when the tempo is fast, as seen from FIG. 14C, the timing determination range with respect to two adjacent candidate positions, i.e., two beats, may be overlapped with each other. In this case, before ending the determination using the timing determination range previous in time, the determination used the timing determination range next in time may be shifted. However, when the timing determination range with respect to two adjacent candidate positions are overlapped with each other and there is a tilting operation of the player to the overlapping timing, a success or failure are determined as a tilting operation of the player with respect to the second marker 232 arranged at the candidate position corresponding to the timing determination range previous in time.

A direction determination range is a range on the orbiting trajectory 240 including the candidate position that the second marker 232 of an operation target is arranged, and is a range for determining whether a direction of a tilting operation of the player to this second marker 232 is correct.

A vertical and horizontal directions of the game screen 200 when the player views the game screen 200 from the front and a vertical and horizontal directions of the analog stick 32 when the player views a surface of the controller 3 provided with the analog stick 32 from the front are corresponding to each other. Therefore, the determination whether a direction of the tilting operation of the player with respect to the second marker 232 is correct is performed using a position in the game screen 200. A direction that the second marker 232 is arranged in the game screen 200 is a direction up to a position that the second marker 232 is arranged when viewed from the center of the orbiting trajectory 240.

The direction up to the position that the second marker 232 is arranged when viewed from the center of the orbiting trajectory 240 is indicated by an angle in the game screen 200 that is two-dimension, and a range that is made to have a width of a predetermined angle (e.g., ±75 degrees) with respect to this angle. As an example, on the assumption that the center of the orbiting trajectory 240 displayed in the game screen 200 is a reference point and a rightward direction of the game screen 200 is a reference direction (i.e., 0 (zero) degree), an angle that a line segment that connects the reference point to the candidate position makes with the reference direction is a direction up to the position that the second marker 232 is arranged from the reference point. However, a value of the angle is increased counterclockwise with respect to the reference direction.

Moreover, a direction that is designated by tilting the analog stick 32 is determined as an angle made with a reference direction when assuming that a rightward direction of the analog stick 32 is the reference direction (i.e., 0 (zero) degree). However, a value of the angle is increased counterclockwise with respect to the reference direction.

Figure 15:
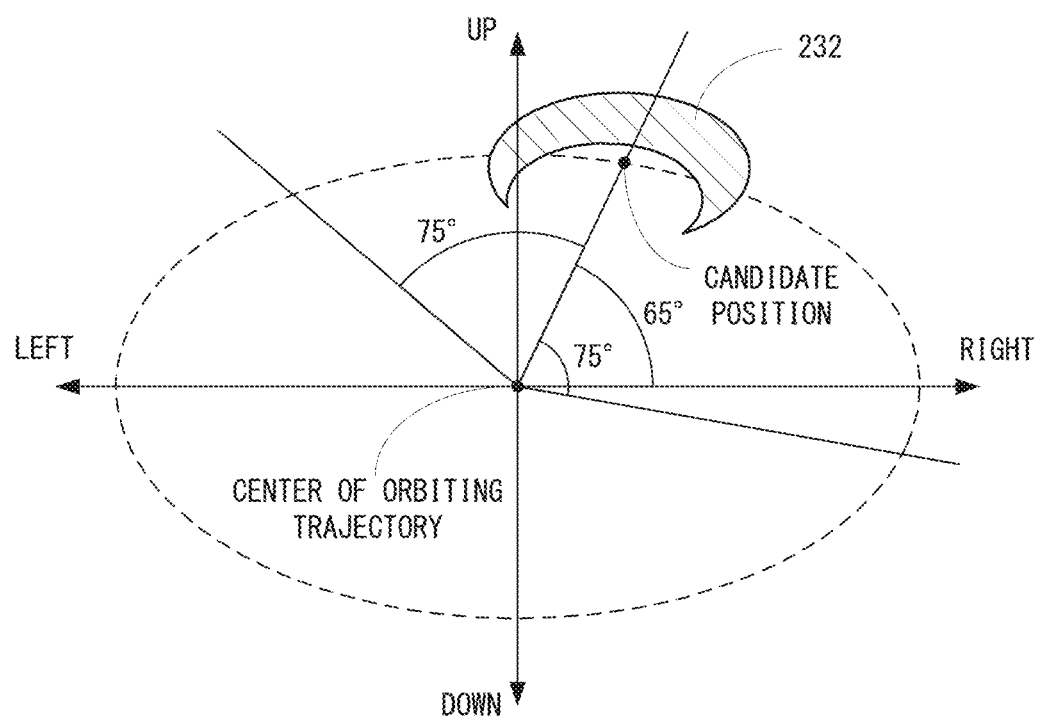
FIG. 15 is a view showing a non-limiting example direction determination range of a second marker.

FIG. 15 is a view showing a non-limiting example direction determination range of the second marker 232. The orbiting trajectory 240 of the game screen 200 and the end point marker 232 shown in FIG. 10 are drawn in FIG. 15. As shown in FIG. 15, the end point marker 232 is arranged in a direction of 65 degrees when viewed from the center of the orbiting trajectory 240. Therefore, the direction determination range with respect to this end point marker 232 is set as a range of −10 degrees (i.e., 350 degrees) to 140 degrees. When the player tilts the analog stick 32 and a tilted direction is within the direction determination range, it is determined that a direction of the tilting operation of the player with respect to the second marker 232 for which this direction determination range is set is in success. On the other hand, when a tilted direction is outside the direction determination range, it is determined that a direction of the tilting operation of the player with respect to the second marker 232 for which this direction determination range is set is in failure.

Thus, the player operates the analog switch 32 so that a position of the first marker 230 that is moved along the orbiting trajectory 240 surrounding the player character 202 designates one or more second markers 232 that are arranged on this orbiting trajectory 240. A direction of the second marker 232 is a direction toward a position that the second marker 232 is arranged from the center of the orbiting trajectory 240, in the game screen 200. Moreover, as described above, the vertical and horizontal directions that are designated by the analog stick 32 are corresponding to the vertical and horizontal directions of the game screen 200. That is, since the direction that the player designates is corresponding to the direction up to the position that the second marker 232 is arranged with respect to the position of the player character 202, a more intuitive operation is possible.

In addition, although the tilted direction is used for determining a success or failure of the tilting operation by the player in the rhythm game of this embodiment, a tilting amount is not used for determination of a success or failure of the tilting operation by the player. However, since the player continues to operate the ZL button 39 during the rhythm game, in order not to detect an unintentional tilting operation, if the tilting amount is less than a predetermined amount, it may be treated as if there is no tilting operation.

Figure 16:
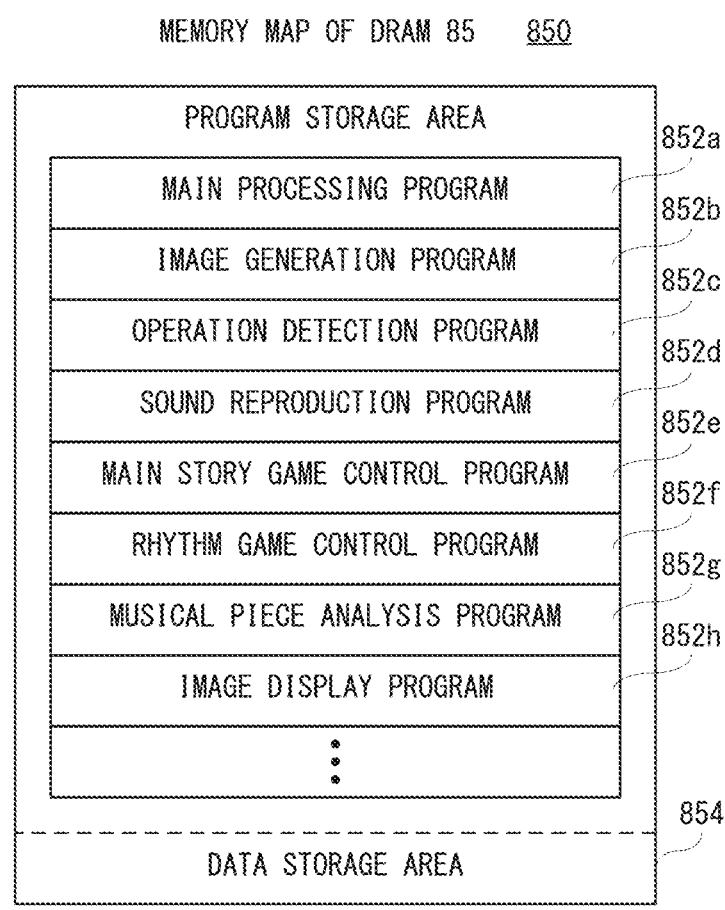
FIG. 16 is a view showing a non-limiting example memory map of a DRAM of the main body apparatus shown in FIG. 6.

FIG. 16 is a view showing a non-limiting example memory map 850 of the DRAM 85 shown in FIG. 6. As shown in FIG. 16, the DRAM 85 includes a program storage area 852 and a data storage area 854. The program storage area 852 is stored with a program of game application (i.e., game program). As shown in FIG. 16, the game program includes a main processing program 852a, an image generation program 852b, an operation detection program 852c, a sound reproduction program 852d, a main story game control program 852e, a rhythm game control program 852f, a musical piece analysis program 852g, an image display program 852h, etc. However, the music piece analysis program 852g is middleware that the main body apparatus 2 is provided with, and therefore, is not included in the game program. Moreover, a function of displaying images such as a game image is a function that the main body apparatus 2 is provided with. Therefore, the image display program 852h is also not included in the game program.

Although a detailed description is omitted, at a proper timing after a power of the main body apparatus 2 is turned on, a part or all of each of the programs 852a-852h is read from the flash memory 84 and/or a storage medium attached to the slot 23 to be stored in the DRAM 85. However, a part or all of each of the programs 852a-852h may be acquired from other computers capable of performing communication with the main body apparatus 2.

The main processing program 852a is a program for executing overall game processing (hereinafter, referred to as "overall processing") of a virtual game of this embodiment.

The image generation program 852b is a program for generating, using image generation data 854b described later, display image data corresponding to various kinds of images such as a game image. The game image includes the player character 202, non-player characters such as an enemy character 204, a background object 210, etc., and may include item objects and a magic circle 220. However, the orbiting trajectory 240 is not included.

The operation detection program 852c is a program for acquiring the operation data 854a from the left controller 3 and/or the right controller 4. Moreover, when one or more further controllers are used, the operation detection program 852c also acquires the operation data 854a from the one or more further controllers.

The sound reproduction program 852d is a program for reproducing a BGM, a sound effect, sounds of the player character 202 and the non-player characters such as the enemy character 204, using the sound data 854c described later. The sound or music piece reproduced according to the sound reproduction program 852d is output from the speaker 88.

The main story game control program 852e is a program for executing game control processing for the main story of the virtual game.

The rhythm game control program 852f is a program for executing game control processing for the rhythm game.

The musical piece analysis program 852g is a program for analyzing a tempo, a beat, etc. of the BGM. Moreover, the musical piece analysis program 852g also analyzes a timing that the beat is ticked for each beat in each bar of the BGM.

The image display program 852h is a program for outputting to a display device the display image data generated according to the image generation program 852b. Therefore, display images corresponding to the display image data (game screen 200, etc.) are displayed on the display device such as the display 12.

In addition, the program storage area 852 is further stored with a communication program for performing communication with other apparatuses, a backup program for storing data in a nonvolatile storage medium such as the flash memory 84, etc.

Moreover, the data storage area 854 is stored with the operation data 854a, the image generation data 854b, the sound data 854c, player character data 854d, analysis data 854e, moving speed data 854f, candidate position data 854g, first marker data 854h, second marker data 854i, third marker data 854j, current timing determination range data 854k, current direction determination data 854m, small rhythm game success determination data 854n, large rhythm game clear determination data 854p, etc. Moreover, a first marker display flag 854q, a wait flag 854r, a small rhythm game success flag 854s, a large rhythm game clear flag 854t, a first output flag 854u, a second output flag 854v, an effect activation flag 854w and a timer 854x are provided in the data storage area 854.

The operation data 854a is operation data received from the left controller 3 and/or the right controller 4. In the embodiment, when the main body apparatus 2 receives the operation data from both of the left controller 3 and the right controller 4, the main body apparatus 2 stores the operation data 854a while making the left controller 3 and the right controller 4 be identifiable. Moreover, when one or more further controllers are used, the main body apparatus 2 stores the operation data 854a while making the one or more further controllers identifiable.

The image generation data 854d is data required for generating the display image data, such as polygon data and texture data.

The sound data 854c is data of a plurality of BGMs, various kinds of sound effects, and sounds of the player character 202 and the non-player characters.

The player character data 854d includes current position data, direction data and item data of the player character 202. The current position data includes data of the three-dimensional coordinates of a current position of the player character 202 in the virtual space. The direction data includes data of a current direction of the player character 202 in the virtual space. The item data includes data of a kind of item and the number of items that the player character 202 possesses.

The analysis data 854e is data of the tempo, the beat and a current reproduction position of the BGM reproduced during the game that are analyzed according to the musical piece analysis program 852g. However, the current reproduction position is a reproduction position in one bar of the BGM under current reproduction.

The moving speed data 854f is data of a moving speed of the first marker 230. The candidate position data 854g are data of the three-dimensional coordinates of each of multiple candidate positions determined on the orbiting trajectory 240 and data of the timing determination range for each of the multiple candidate positions.

The first marker data 854h is three-dimensional coordinate data of a current position of the first marker 230. The second marker data 854i is three-dimensional coordinate data of positions that one or more second markers 232 are arranged. The third marker data 854j is three-dimensional coordinate data of positions that one or more third markers 234 are arranged. However, when the third marker 234 is not arranged, the third marker data 854j is not stored.

The current timing determination range data 854k is data of a determination range of the timing for a tilting operation that is set with respect to the candidate position at which the first marker 230 arrives next. However, when the third marker 234 is arranged at the candidate position at which the first marker 230 arrives next, NULL data is stored as the current timing determination range data 854k. The current direction determination range data 854m is data of a determination range for a direction of the tilting operation that is set with respect to the candidate position at which the first marker 230 arrives next.

The small rhythm game success determination data 854n is data for determining whether the small rhythm game is in success. Specifically, the small rhythm game success determination data 854h is data that indicates a determination result on a success or failure of a tilting operation of the player with respect to each second marker 232 arranged on the orbiting trajectory 240 during a time period that the first marker 230 is moved on the orbiting trajectory 240 one round. In this embodiment, since four second marker 232 are arranged on the orbiting trajectory 240 at the maximum, the small rhythm game success determination data is 4-bit data, in which each bit indicates a success or failure of a tilting operation of the player with respect to each second marker 232. When the first marker 230 starts each round, all bits of the small rhythm game success determination data 854n are set to "1", and a determination result of a success or failure of a tilting operation of the player with respect to the second marker 232 is written in an order from the most significant bit to the least significant bit. If it is determined that the tilting operation of the player with respect to the second marker 232 is in success, a value of a corresponding bit is still "1", and if it is determined that the tilting operation of the player with respect to the second marker 232 is in failure, "0" is set to a corresponding bit. When the first marker 230 is moved on the orbiting trajectory 240 one round and "1" is set to all the bits of small rhythm game success determination data 854n, it is determined that the small rhythm game is in success. On the other hand, it is determined that the small rhythm game is in failure when any one bit of the small rhythm game success determination data 854n is set to "0".

The large rhythm game clear determination data 854p is data for determining whether the large rhythm game is cleared, and is numeral data that indicates the number of success times of the small rhythm game. When the number of success times of the small rhythm game indicates a predetermined number of times, it is determined that the large rhythm game is in success.

The first marker display flag 854q is a flag that indicates whether the first marker 230 is to be displayed. When the first marker 230 is to be displayed, the first marker display flag 854q is turned on. When the first marker 230 is not to be displayed, the first marker display flag 854q is turned off.

The wait flag 854r is a flag indicating whether to wait for arranging each of the one or more second markers 232 at the candidate positions. When the rhythm game is started, and when it is determined that the large rhythm game is cleared, the wait flag 854r is turned on. When the first marker 230 is moved on the orbiting trajectory 240 one round in a state where the second markers 232 is not arranged at all the candidate positions, the wait flag 854r is turned off.

The small rhythm game success flag 854s is a flag indicating whether the small rhythm game is in success. When it is determined that the small rhythm game is in success, the small rhythm game success flag 854s is turned on. When the small rhythm game is not in success, the small rhythm game success flag 854s is turned off. However, a case where the small rhythm game is not in success includes a case where a success or failure of the small rhythm game is not determined and a case where the small rhythm game is in failure.

The large rhythm game success flag 854t is a flag indicating whether the large rhythm game is cleared. When it is determined that the large rhythm game is cleared, the large rhythm game success flag 854t is turned on. When the large rhythm game is not cleared, the large rhythm game success flag 854t is turned off.

The first output flag 854u is a flag indicating whether the first sound effect is to be reproduced when the first marker 230 arrives at the candidate position that the third marker 234 is arranged or the candidate position that the second marker 232 except the end point marker 232 is arranged. When the first sound effect is to be reproduced, the first output flag 854u is turned on. When the first sound effect is not to be reproduced, the first output flag 854u is turned off.

The second output flag 854v is a flag indicating whether the second sound effect is to be reproduced when the first marker 230 arrives at the candidate position that the end point marker 232 is arranged. When the second sound effect is to be reproduced, the second output flag 854v is turned on. When the second sound effect is not to be reproduced, the second output flag 854v is turned off.

The effect activation flag 854w is a flag indicating whether an effect based on that the rhythm game is cleared is to be activated. When an effect is to be activated, the effect activation flag 854w is turned on. When an effect is not to be activated, the effect activation flag 854w is turned off.

The timer 854x is a counter for counting a time period required the first marker 230 is moved to the current position from the reference candidate position when the first marker 230 is moved along with the orbiting trajectory 240, and reset and started at every time that the first marker 230 is moved on the orbiting trajectory 240 one round.

Although illustration is omitted, the data storage area 854 is stored with data of the non-player character including the enemy character 204 and the background object 210 that are arranged in the virtual space, and other data such as third marker data of the three-dimensional coordinate data of positions that one or more third markers 234 are arranged, and is provided with other flags and timers (or counters).

Figure 18:
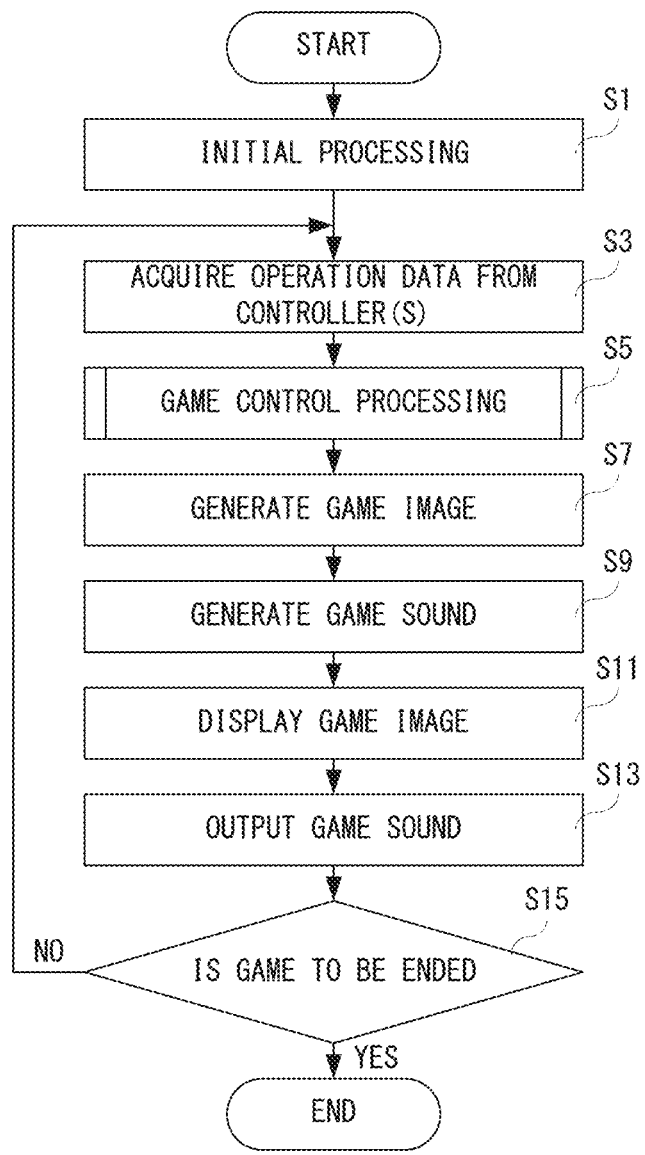
FIG. 18 is a flowchart showing non-limiting example overall processing of a processor(s) of the main body apparatus shown in FIG. 6.
Figure 19:
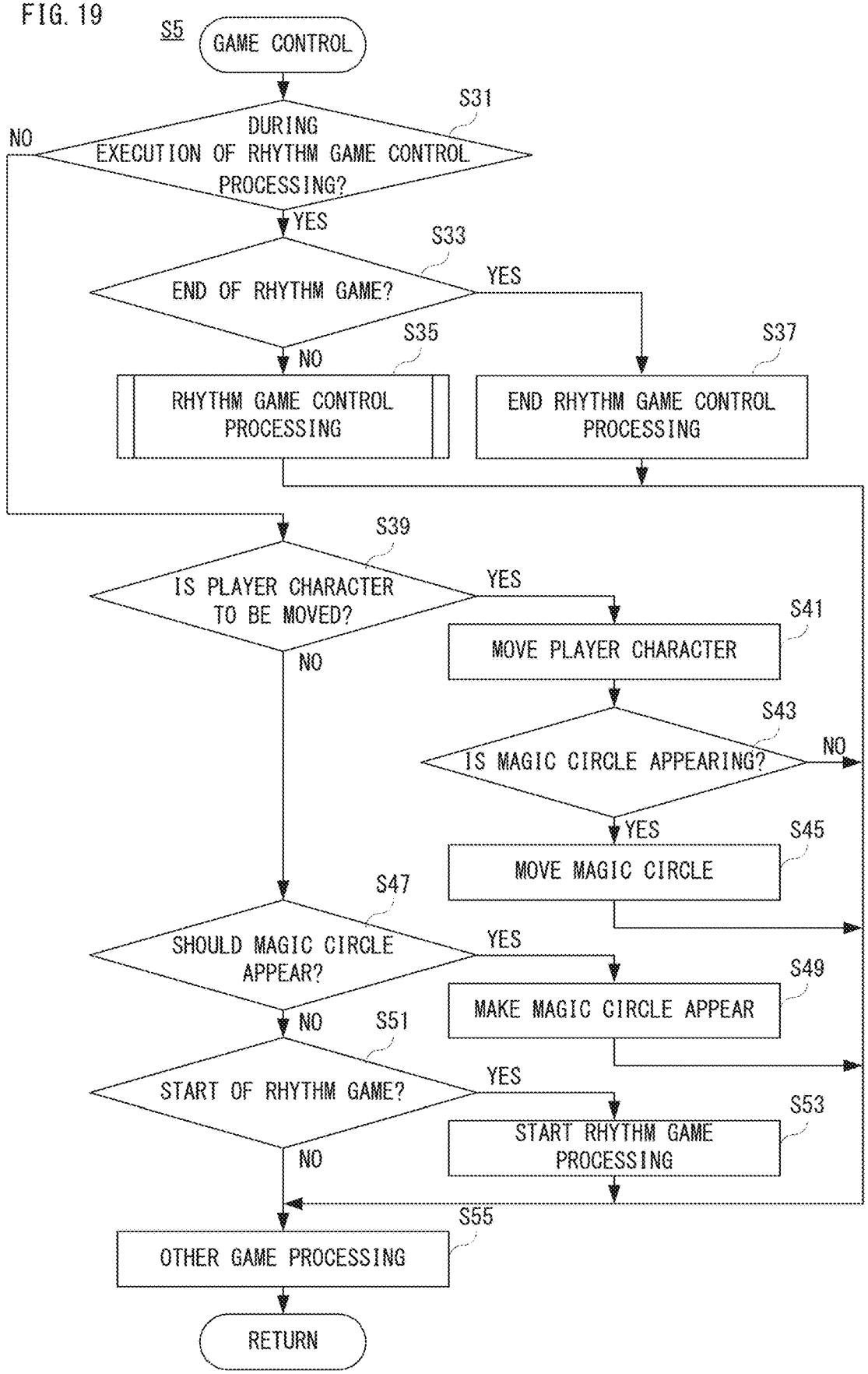
FIG. 19 is a flowchart showing non-limiting example game control processing of the processor(s) of the main body apparatus shown in FIG. 6.

FIG. 18 is a flowchart showing non-limiting example processing (overall processing) of the game program by the processor 81 (or computer) of the main body apparatus 2. FIG. 19 is a flowchart showing non-limiting example game control processing of the processor 81 of the main body apparatus 2. FIG. 20-FIG. 27 are flowcharts showing non-limiting example rhythm game control processing of the processor 81 of the main body apparatus 2. In the following, the overall processing, the game control processing and the rhythm game control processing will be described using FIG. 18-FIG. 27.

However, processing of respective steps of the flowcharts shown in FIG. 18-FIG. 27 are mere examples, and if the same or similar result is obtainable, an order of the respective steps may be exchanged. Moreover, in the embodiment, it will be described that the processing of the respective steps of the flowcharts shown in FIG. 18-FIG. 27 are basically executed by the processor 81; however, some steps may be executed by a processor(s) and/or a dedicated circuit(s) other than the processor 81.

When the power of the main body apparatus 2 is turned on, prior to execution of the overall processing, the processor 81 executes a boot program stored in a boot ROM not shown, whereby respective units including the DRAM 85, etc. are initialized. When the execution of the game program of the embodiment is instructed by the player, the main body apparatus 2 will start the overall processing.

As shown in FIG. 18, if the overall processing is started, that is, the main story of the virtual game is started, the processor 81 executes initial setting in a step S1. Here, the processor 81 determines positions and directions that the player character 202, the non-player character (including the enemy character 204) and the background object 210 are to be arranged as initial positions and initial directions in the virtual space. However, in starting the virtual game from where the player left off, the positions and the directions that the player character 202, the non-player character (including the enemy character 204) and the background object 210 are to be arranged are determined as the positions and the directions at the time of being saved. Therefore, the player character data 854c in which the initial position and the initial direction or the position and the direction at the time of being saved of the player character 202 are set as the current position data and the current direction data are stored in the data storage area 854.

In a subsequent step S3, the operation data transmitted from the left controller 3 and/or the right controller 4 is acquired, and in a step S5, the game control processing described later is executed (see FIG. 19).

In a next step S7, the game image (i.e., display image) is generated. Here, the processor 81 generates a certain situation or scene by arranging in the three-dimensional virtual space various kinds of objects and characters based on a result of the game control processing in the step S5 to generate the game image data corresponding to the game image (game screen 200, etc.) that the generated scene is imaged by the virtual camera. However, in the rhythm game, since the first marker 230 is not displayed in the game screen 200 when the first marker display flag 854q is turned off, the first marker 230 is not arranged in the virtual space. On the other hand, since the first marker 230 is displayed in the game screen 200 when the first marker display flag 854q is turned on, the first marker 230 is arranged in the virtual space. Moreover, as described later, when a predetermined effect is activated in the game control processing, the game image data corresponding to the game image expressing that the predetermined effect activated is generated.

In a next step S9, a game sound is generated. Here, the processor 81 generates the sound data corresponding to the game sound according to the result of the game control processing in the step S5. However, the game sound means a sound required for the game, such as a sound of the player character 202 and a sound of non-player characters such as the enemy character 204, the BGM and the sound effect. Therefore, the game sound including the BGM is generated in the main story or the rhythm game in the virtual game. Moreover, in the rhythm game, the game sound including the BGM and the first sound effect is generated when the first output flag 854u is turned on, and when the second output flag 854v is turned on, the game sound including the BGM and the second sound effect is generated. Moreover, the sounds of the player character and the non-player character such as the enemy character 204 are included in the game sound as necessary. As described above, a BGM to be reproduced is changed (or determined) according to a scene or progress situation of the virtual game.

In a next step S11, the game image is displayed. Here, the processor 81 outputs the game image data generated in the step S7 to the display 12. Moreover, the game sound is output in a step S13. Here, the processor 81 outputs the game sound data generated in the step S9 to the speaker 88 through the codec circuit 87. Therefore, in the main story or the rhythm game in the virtual game, the BGM is reproduced, and in the rhythm game, the first sound effect is further output when the position of the first marker 230 is overlapped with the position of the rhythm markers other than the end point marker 232, and the second sound effect is further output when the position of the first marker 230 is overlapped with the position of the end point marker 232. Moreover, the sounds of the player character 202 and the non-player character such as the enemy character 204 are output as necessary.

Then, in a step S15, it is determined whether the game is to be ended. The determination in the step S15 is performed based on whether the player issues an instruction to end the game. If "NO" is determined in the step S15, that is, if the game is not to be ended, the process returns to the step S3. On the other hand, if "YES" is determined in the step S15, that is, if the game is to be ended, the overall game processing is terminated.

As shown in FIG. 19, if the game control processing shown in the step S5 is started, the processor 81 determines, in a step S31, whether it is during execution of rhythm game control processing. If "YES" is determined in the step S31, that is, if it is during execution of the rhythm game control processing, it is determined, in a step S33, whether the rhythm game is to be ended. Here, the processor 81 determines whether the operation data acquired in the step S3 does not indicate the operation of the ZL button 39. Alternatively, the processor 81 determines whether the operation data is not acquired in the step S3. Alternatively, the processor 81 determines whether the large rhythm game clear flag 854t is turned on.

If "NO" is determined in the step S33, that is, if the rhythm game is not to be ended, the rhythm game control processing described later (see FIG. 20-FIG. 27) is executed in a step S35, and the process proceeds to a step S55. On the other hand, if "YES" is determined in the step S33, that is, if the rhythm game is to be ended, the rhythm game control processing is ended in a step S37, and the process proceeds to the step S55.

If "NO" is determined in the step S31, that is, if it is not during execution of the rhythm game control processing, it is determined, in a step S39, whether the player character 202 is to be moved. Here, the processor 81 determines whether the operation data acquired in the step S3 indicates a tilting operation of the analog stick 32.

If "YES" is determined in the step S39, that is, if the player character 202 is to be moved, the player character 202 is moved according to an operation input in a step S41. In this step S41, the processor 81 changes the position and the direction of the player character 202 to a direction according to the tilting operation of the analog stick 32. That is, the current position data and the current direction data of the player character 202 are updated. Although illustration is omitted, the player character 202 acquires an item when approaching or arriving at a position of the item. When the player character 202 acquires an item, the item data of the player character data 854d is updated. That is, the number of the acquired items is increased.

In a next step S43, it is determined whether a magic circle 220 has appeared. If "NO" is determined in the step S43, that is, if a magic circle 220 has not appeared, the process proceeds to the step S55. On the other hand, if "YES" is determined in the step S43, that is, if a magic circle 220 has appeared, the magic circle 220 is made to be moved according to a movement of the player character 202 in a step S45, and the process proceeds to the step S55.

If "NO" is determined in the step S39, that is, if the player character 202 is not to be moved, it is determined, in a step 47, whether a magic circle 220 is to be made to appear. Here, the processor 81 determines whether the operation data acquired in the step S3 indicates an operation of the ZL button 39.

If "YES" is determined in the step S47, that is, if a magic circle 220 is to be made to appear, a magic circle 220 is made to appear in front of the player character 220 in a step S49, and the process proceeds to the step S55. On the other hand, if "NO" is determined in the step S47, that is, if a magic circle 220 is not to be made to appear, it is determined, in a step S51, the rhythm game is to be started. Here, the processor 81 determines whether a magic circle 220 has appeared in a state that a predetermined flower object 210a is arranged near the player character 202. Alternatively, the processor 81 determines whether the magic circle 220 that is moved according to a movement of the player character 202 is overlapped with or approaches within a predetermined distance from the predetermined flower object 210a.

If "YES" is determined in the step S51, that is, if the rhythm game is to be started, the rhythm game control processing is started in a step S53, and the process proceeds to the step S55. When starting the rhythm game control processing in the step S53, the processor 81 resets the small rhythm game success determination data 854n and the large rhythm game clear determination data 854p, and turns off the small rhythm game success flag 854s, the large rhythm game clear flag 854t, the first output flag 854u, the second output flag 854v and the effect activation flag 854w.

On the other hand, if "NO" is determined in the step S51, that is, if the rhythm game is not to be started, other game processing is executed in the step S55, and the game control processing is ended and the process returns to the overall processing shown in FIG. 18. In the step S55, the processor 81 executes the game processing, such as making the player character 202 attack the enemy character 204 according to an operation of the player, making the player character 202 use an item according to an operation of the player, making the enemy character 204 move, making the enemy character 204 attack the player character 202, making an item appear, etc. Moreover, if the effect activation flag 854w is turned on, in the step S55, the processor 81 activates the predetermined effect. Furthermore, in the step S55, the processor 81 determines the game clear or game over.

Figure 20:
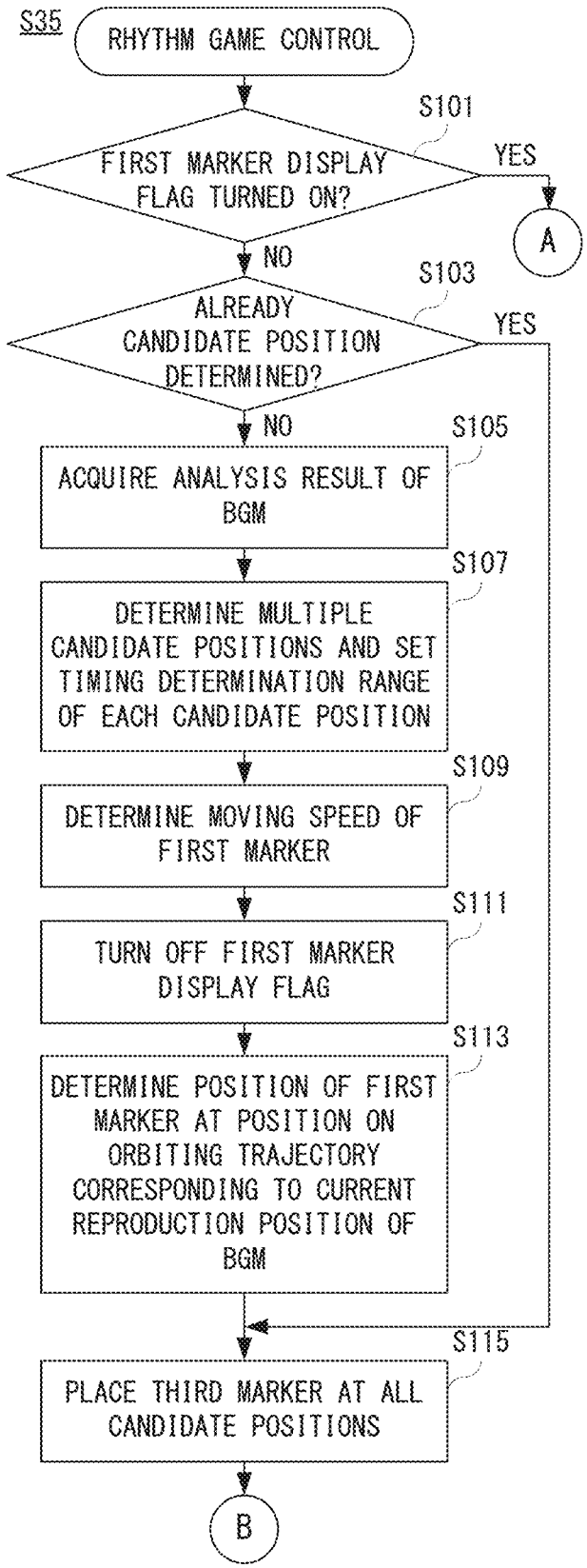
FIG. 20 is a flowchart showing a first part of non-limiting example rhythm game control processing of the processor(s) of the main body apparatus shown in FIG. 6.

As shown in FIG. 20, when starting the rhythm game control processing, the processor 81 determines, in a step S101, whether the first marker display flag 854q is turned on. If "YES" is determined in the step S101, that is, if the first marker display flag 854q is turned on, the process proceeds to a step S127 shown in FIG. 22. On the other hand, if "NO" is determined in the step S101, that is, if the first marker display flag 854q is turned off, it is determined, in a step S103, whether a candidate position has been determined.

Figure 21:
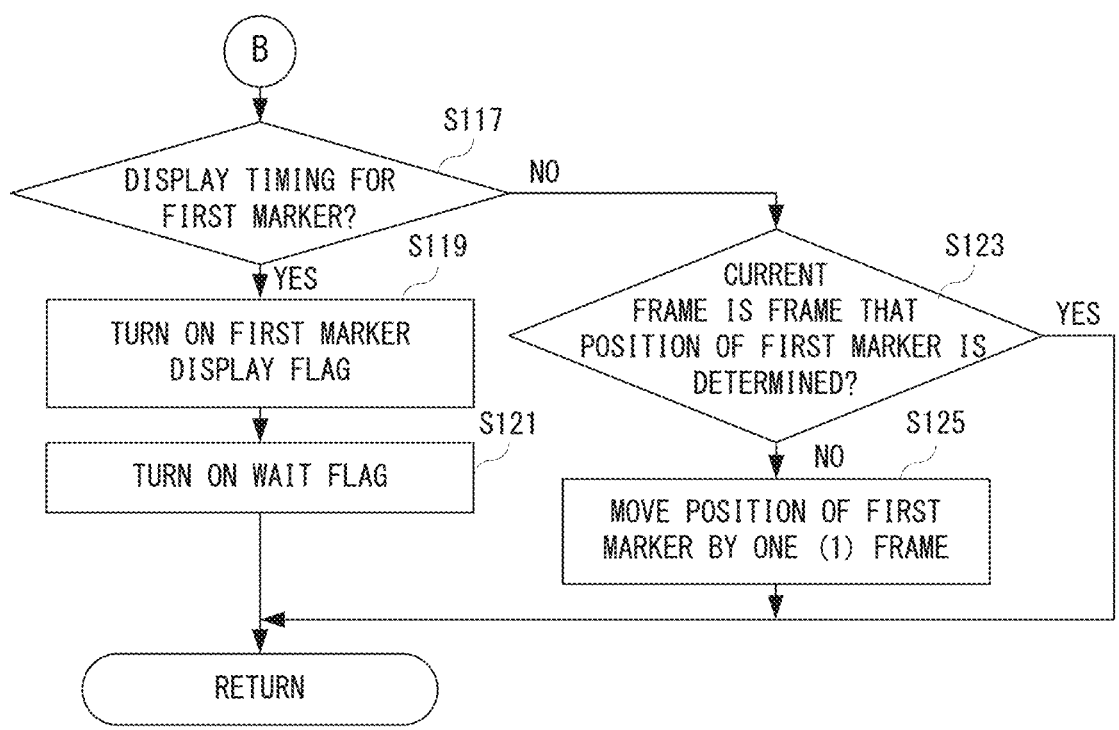
FIG. 21 is a flowchart showing a second part of the non-limiting example rhythm game control processing of the processor(s) of the main body apparatus shown in FIG. 6, following FIG. 20.

If "YES" is determined in the step S103, that is, if a candidate position has been determined, the process proceeds to a step S117 shown in FIG. 21. On the other hand, if "NO" is determined in the step S103, that is, if a candidate position has not been determined, in a step S105, an analysis result of the BGM analyzed by general-purpose middleware is acquired. That is, the processor 81 acquires data of the tempo, the beat and the current reproduction position of the BGM. At this time, the processor 81 stores analysis data 854e of the analysis result to the data storage area 854.

In a next step S107, multiple candidate positions are determined according to the beat of the BGM included in the acquired analysis result, and the timing determination range for each candidate position is set according to the tempo of the BGM included in the acquired analysis result. However, the number of candidate positions corresponds to the number of the beats in one bar of the BGM. Moreover, the candidate position that is determined to the position in front of the player character 202 is a movement start position of the first marker 230 in one bar, and the timing determination ranges for respective candidate positions are set in an order following the number of beats.

In a subsequent step S109, a moving speed of the first marker 230 according to the tempo of the BGM included in the acquired analysis result is determined. In a next step S111, the first marker display flag 854q is turned off, and the position of the first marker 230 is determined to a position on the orbiting trajectory 240 that corresponds to the current reproduction position of the BGM included in the acquired analysis result in a step S113. Subsequently, the third marker 234 is arranged at each of all the candidate positions in a step S115, and the process proceeds to the step S117.

In the step S117 shown in FIG. 21, it is determined whether it is a display timing of the first marker 230. As described above, the processor 81 determines whether the current reproduction position is between the last beat in immediately before bar and the first beat in the current bar, and if the current reproduction position is between beyond the first beat and before the last beat in the current bar, and determines whether the current reproduction position is a timing that the last beat in the current one bar is to be ticked.

If "YES" is determined in the step S117, that is, if it is a display timing of the first marker 230, the first marker display flag 854q is turned on in a step S119, and in a step S121, the wait flag 854r is turned on, and then, the rhythm game control processing is ended to return to the game control processing.

If "NO" is determined in the step S117, that is, if it is not a display timing of the first marker 230, it is determined, in a step S123, whether a current frame is a frame that the position of the first marker 230 is determined in the step S113. If "YES" is determined in the step S123, that is, if the current frame is a frame that the position of the first marker 230 is determined in the step S113, the rhythm game control processing is ended to return the game control processing. On the other hand, if "NO" is determined in the step S123, that is, if the current frame is not a frame that the position of the first marker 230 is determined in the step S113, the position of the first marker 230 is moved along the orbiting trajectory 240 by one frame in a step S125, and the rhythm game control processing is ended to return the game control processing. The first marker data 854h is updated in the step S125. That is, the three-dimensional coordinate data of the current position of the first marker 230 is updated.

Figure 22:
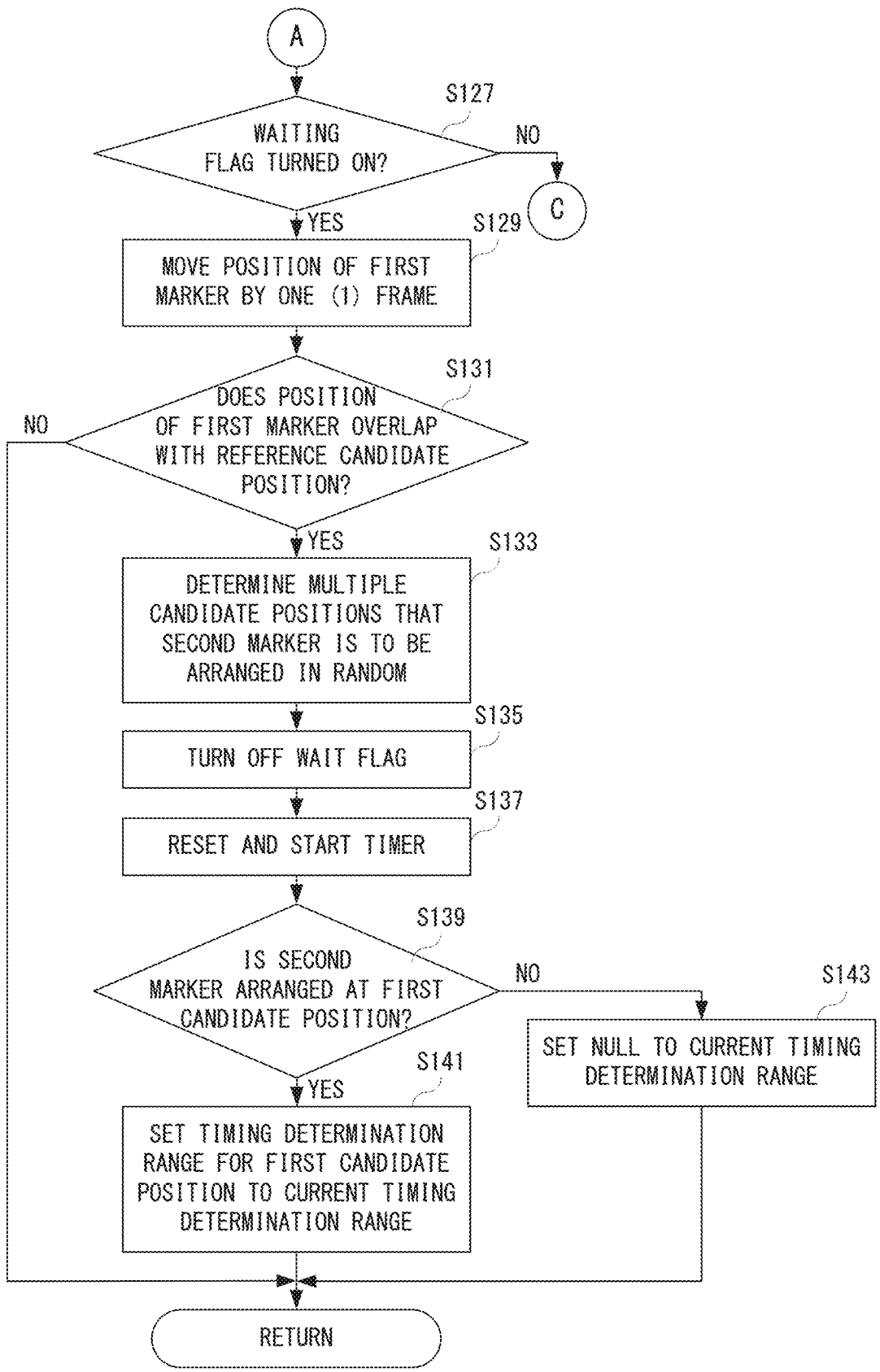
FIG. 22 is a flowchart showing a third part of the non-limiting example rhythm game control processing of the processor(s) of the main body apparatus shown in FIG. 6, following FIG. 21.

As described above, if "YES" is determined in the step S101, it is determined, in a step S127 shown in FIG. 22, whether the wait flag 854r is turned on. If "YES" is determined in the step S127, that is, if the wait flag 854r is turned on, the position of the first marker 230 is moved along the orbiting trajectory 240 by one frame in a step S129, and then, it is determined, in a step S131, whether the position of the first marker 230 is overlapped with the reference candidate position.

If "NO" is determined in the step S131, that is, if the position of the first marker 230 is not overlapped with the reference candidate position, the rhythm game control processing is ended to return the game control processing. On the other hand, if "YES" is determined in the step S131, that is, if the position of the first marker 230 is overlapped with the reference candidate position, in a step S133, one or more candidate positions at which one or more second markers 232 that are determined at random are to be arranged at random are determined. At this time, arranging one or more third markers 234 to one or more candidate positions at each of which the second marker 232 is not arranged is determined. The same applies to a step S189 described later.

In a next step S135, the wait flag 854r is turned off, and the timer 854x is reset and started in a step S137. Subsequently, it is determined, in a step S139, whether the second marker 232 is arranged at the first candidate position (i.e., the first beat) with reference to the second marker data 854i.

If "YES" is determined in the step S139, that is, if the second marker 232 is arranged at the first candidate position, the timing determination range for the first candidate position is set to the current timing determination range in a step S141, and the rhythm game control processing is ended to return to the game control processing. In the step S141, the timing determination range of the first candidate position that is set in the step S107 is set as the current timing determination range.

On the other hand, if "NO" is determined in the step S139, that is, if the second marker 232 is not arranged at the first candidate position, in a step S143, NULL is set to the current timing determination range, and the rhythm game control processing is ended to return to the game control processing. In the step S143, the processor 81 sets NULL data as the current timing determination range data 854k.

Figure 23:
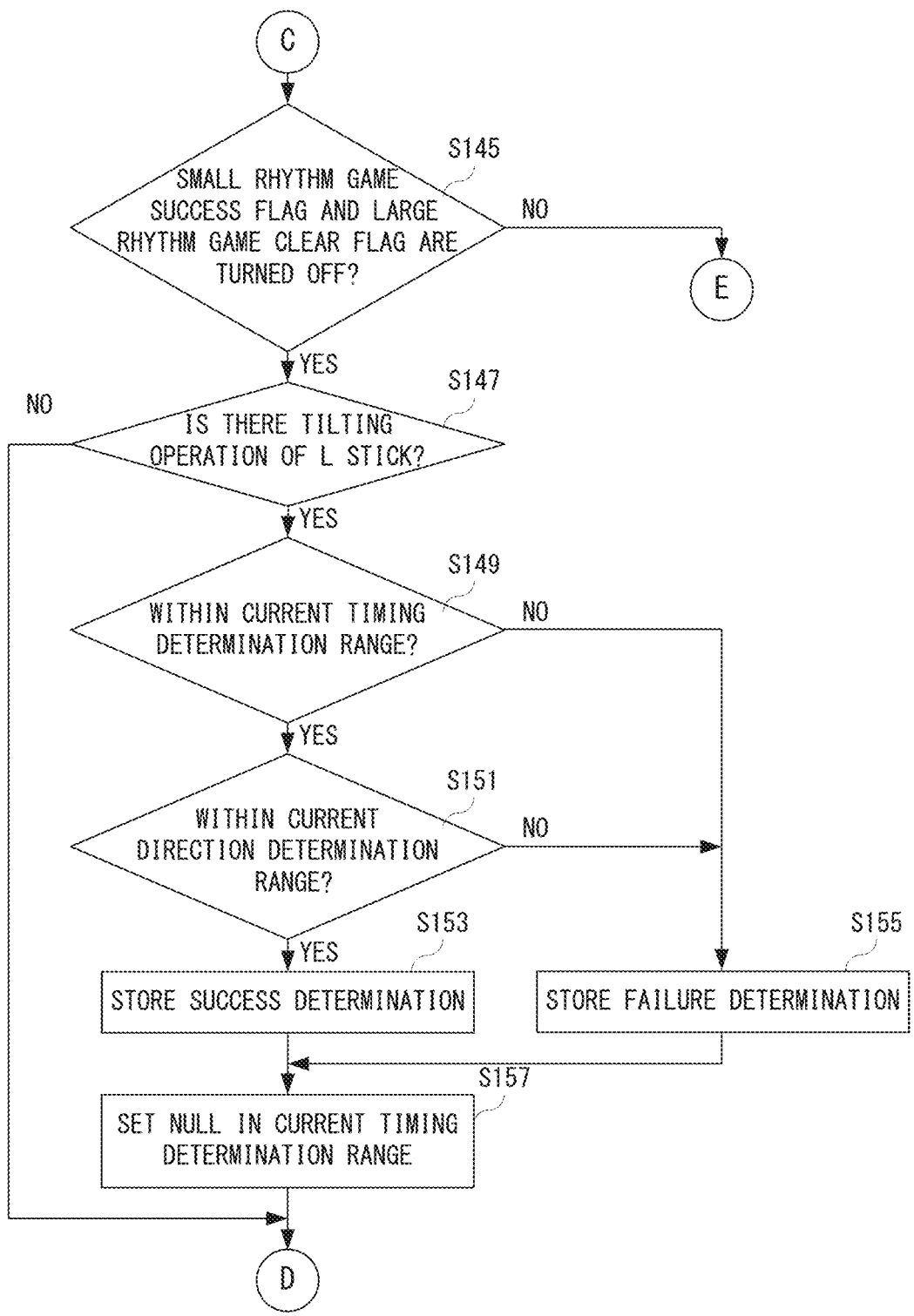
FIG. 23 is a flowchart showing a fourth part of the non-limiting example rhythm game control processing of the processor(s) of the main body apparatus shown in FIG. 6, following FIG. 22.

Moreover, if "NO" is determined in the step S127, that is, if the wait flag 854r is turned off, it is determined, in a step S145 shown in FIG. 23, whether the small rhythm game success flag 854s and the large rhythm game clear flag 854t are both turned off. If "YES" is determined in the step S145, that is, if the small rhythm game success flag 854s and the large rhythm game clear flag 854t are turned off, it is determined, in a step S147, whether there is any tilting operation of the L stick. Here, the processor 81 determines whether the operation data acquired in the step S3 indicates the tilting operation of the analog stick 32.

Figure 24:
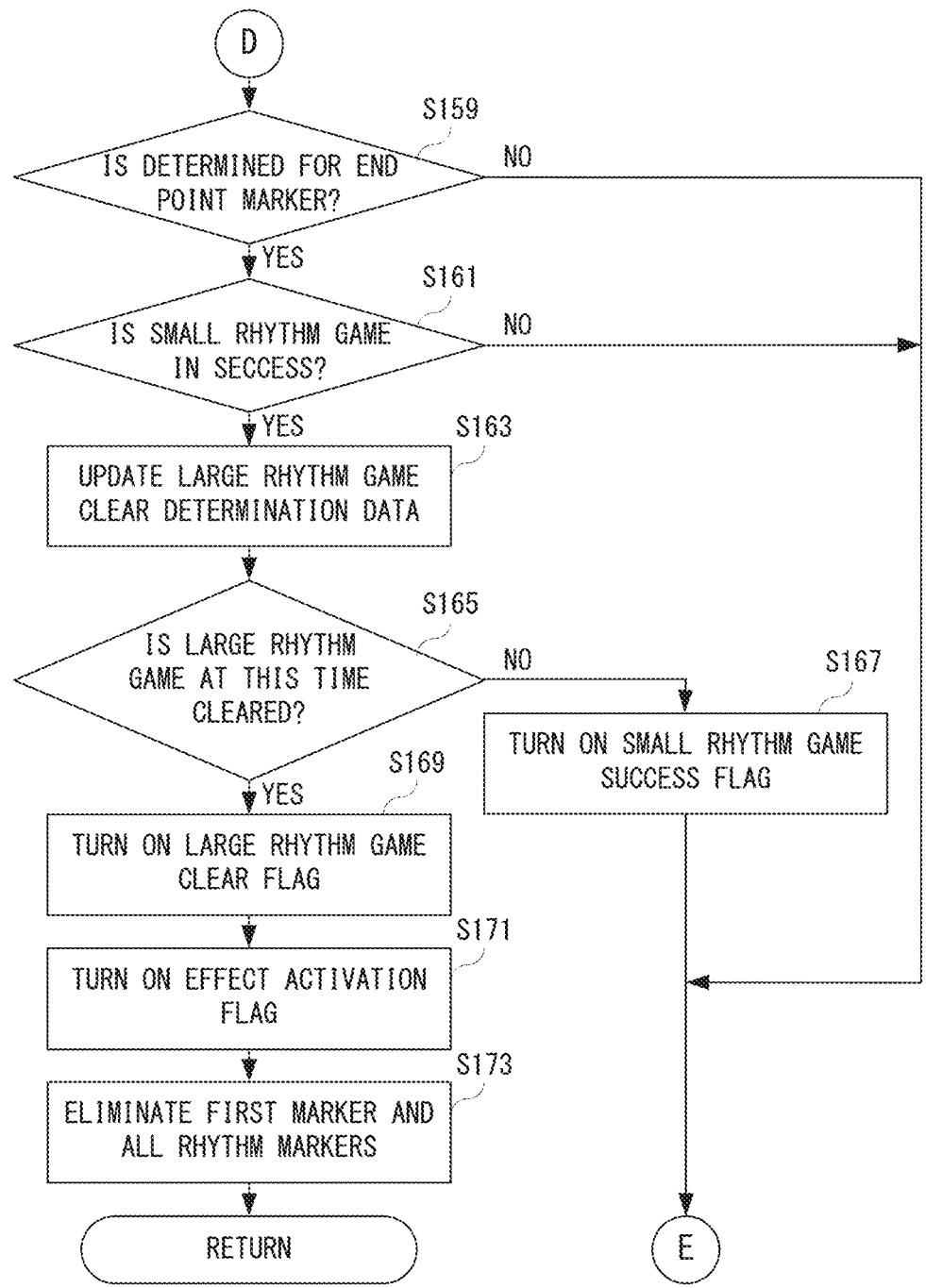
FIG. 24 is a flowchart showing a fifth part of the non-limiting example rhythm game control processing of the processor(s) of the main body apparatus shown in FIG. 6, following FIG. 23.

If "NO" is determined in the step S147, that is, if there is no tilting operation of the L stick, the process proceeds to a step S159 shown in FIG. 24. On the other hand, if "YES" is determined in the step S147, that is, if there is a tilting operation of the L stick, it is determined, in a step S149, whether a timing of the tilting operation is within the current timing determination range.

If "NO" is determined in the step S149, that is, if a timing of the tilting operation is outside the current timing determination range, the process proceeds to a step S155. On the other hand, if "YES" is determined in the step S149, that is, if a timing of the tilting operation is within the current timing determination range, it is determined, in a step S151, whether a tilting direction of the L stick is within the current direction determination range.

If "YES" is determined in the step S151, that is, if a tilting direction of the L stick is within the current direction determination range, in a step S153, a success determination for the tilting operation with respect to the second marker 232 that is an operation target is stored, and in a step S157, NULL is set to the current timing determination range, and then, the process proceeds to a step S159. In the step S153, the processor 81 does not change the value of the bit corresponding to the second marker 232 that is an operation target in the small rhythm game success determination data 854n.

On the other hand, if "NO" is determined in the step S151, that is, if the tilting direction of the L stick is outside the direction determination range, in a step S155, a failure determination is stored for the tilting operation with respect to the second marker 232 that is an operation target, and the process proceeds to a step S157. In the step S155, the processor 81 changes to "0" of the value of the bit corresponding to the second marker 232 that is an operation target in the small rhythm game success determination data 854n.

In the step S159 shown in FIG. 24, it is determined whether a success or failure of the tilting operation of the player with respect to the end point marker 232 has been determined. If "NO" is determined in the step S159, that is, if a success or failure of the tilting operation of the player with respect to the end point marker 232 has not been determined, the process proceeds to a step S175 shown in FIG. 25. On the other hand, if "YES" is determined in the step S159, that is, if a success or failure of the tilting operation of the player with respect to the end point marker 232 has been determined, it is determined, in a step S161, whether the small rhythm game is in success. Here, the processor 81 determines, with reference to the small rhythm game success determination data 854n, whether "1" is set to all the bits.

If "NO" is determined in the step S161, that is, if the small rhythm game is in failure, the process proceeds to a step S175. On the other hand, if "YES" is determined in the step S161, that is, if the small rhythm game is in success, the large rhythm game clear determination data is updated in a step S163. That is, the processor 81 increments the number of success times of the small rhythm game by one.

In a next step S165, it is determined whether the large rhythm game at this time is cleared. Here, the processor 81 determines, with reference to the large rhythm game clear determination data 854p, whether the number of success times of the small rhythm game indicates the predetermined number of times.

If "NO" is determined in the step S165, that is, if the large rhythm game at this time is not cleared, in a step S167, the small rhythm game success flag 854s is turned on, and the process proceeds to a step S175. On the other hand, if "YES" is determined in the step S165, that is, if the large rhythm game at this time is cleared, the large rhythm game clear flag 854t is turned on in a step S169, the effect activation flag 854w is turned on in a step S171, and the first marker 230 and all the rhythm markers are eliminated in a step S173, and then, the rhythm game control processing is ended to return to the game control processing. In the step S173, the first marker data 854h, the second marker data 854i and the third marker data 854j are eliminated.

Figure 25:
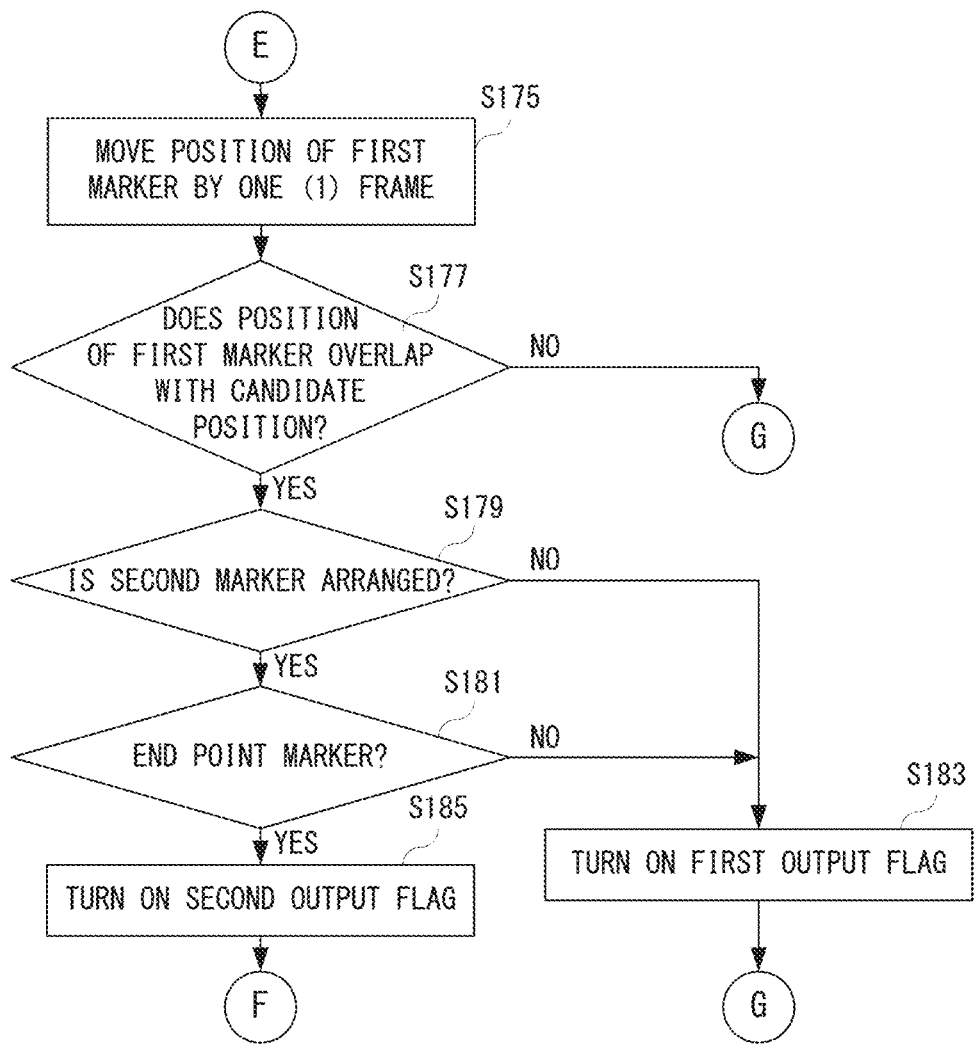
FIG. 25 is a flowchart showing a sixth part of the non-limiting example rhythm game control processing of the processor(s) of the main body apparatus shown in FIG. 6, following FIG. 24.

As shown in FIG. 25, in the step S175, the position of the first marker 230 is moved along the orbiting trajectory 240 by one frame, and in a next step S177, it is determined whether the position of the first marker 230 is overlapped with the candidate position. If "NO" is determined in the step S177, that is, if the position of the first marker 230 is not overlapped with the candidate position, the process proceeds to a step S197 shown in FIG. 27. On the other hand, if "YES" is determined in the step S177, that is, if the position of the first marker 230 is overlapped with the candidate position, it is determined, in a step S179, whether the second marker 232 is arranged at the candidate position with which the position of the first marker 230 is overlapped.

If "NO" is determined in the step S179, that is, if the third marker 234 is arranged at the candidate position with which the position of the first marker 230 is overlapped, the process proceeds to a step S183. On the other hand, if "YES" is determined in the step S179, that is, if the second marker 232 is arranged at the candidate position with which the position of the first marker 230 is overlapped, it is determined, in a step S181, whether the second marker 232 is the end point marker 232.

If "NO" is determined in the step S181, that is, if the second marker 232 being arranged is not the end point marker 232, in the step S183, the first output flag 854u is turned on, and the process proceeds to a step S197. On the other hand, if "YES" is determined in the step S181, that is, if the second marker 232 being arranged is the end point marker 232, in a step S185, the second output flag 854v is turned on, and the process proceeds to a step S187 shown in FIG. 26.

Figure 26:
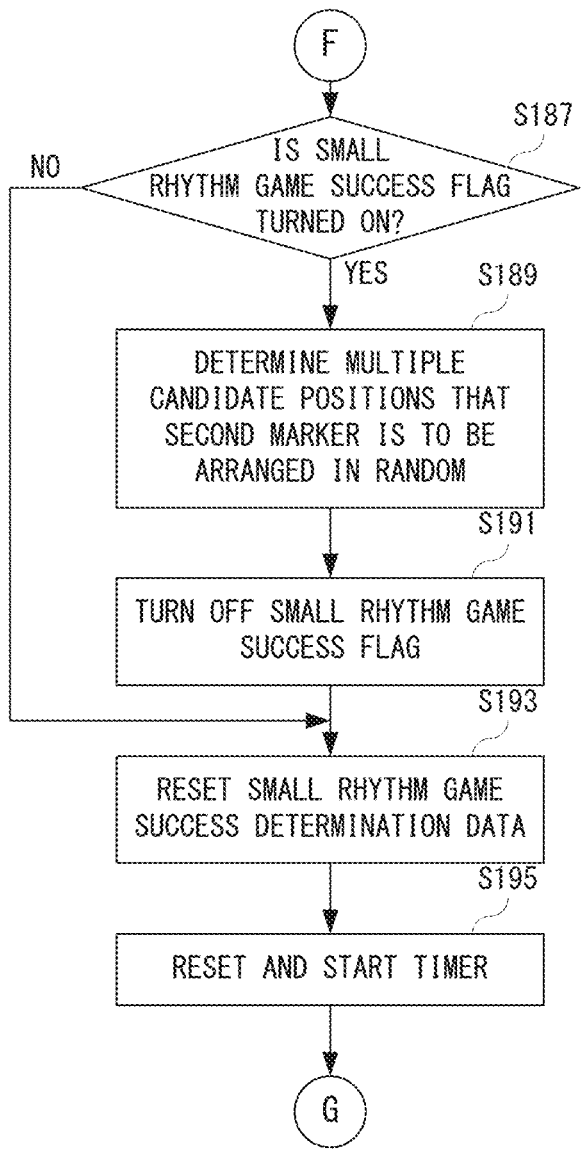
FIG. 26 is a flowchart showing a seventh part of the non-limiting example rhythm game control processing of the processor(s) of the main body apparatus shown in FIG. 6, following FIG. 25.

As shown in FIG. 26, in the step S187, it is determined whether the small rhythm game success flag 854s is turned on. If "NO" is determined in the step S187, that is, if the small rhythm game success flag 854s is turned off, the process proceeds to a step S193. On the other hand, if "YES" is determined in the step S187, that is, if the small rhythm game success flag 854s is turned on, in the step S189, one or more candidate positions at which one or more second markers 232 that are determined at random are to be arranged at random are determined. That is, one or more second markers 232 that are determined at random are rearranged. In a next step S191, the small rhythm game success flag 854s is turned off, and the process proceeds to the step S193.

In the step S193, the small rhythm game success data 854n is reset. Subsequently, in a step S195, the timer 854x is reset and started, and the process proceeds to the step S197.

Figure 27:
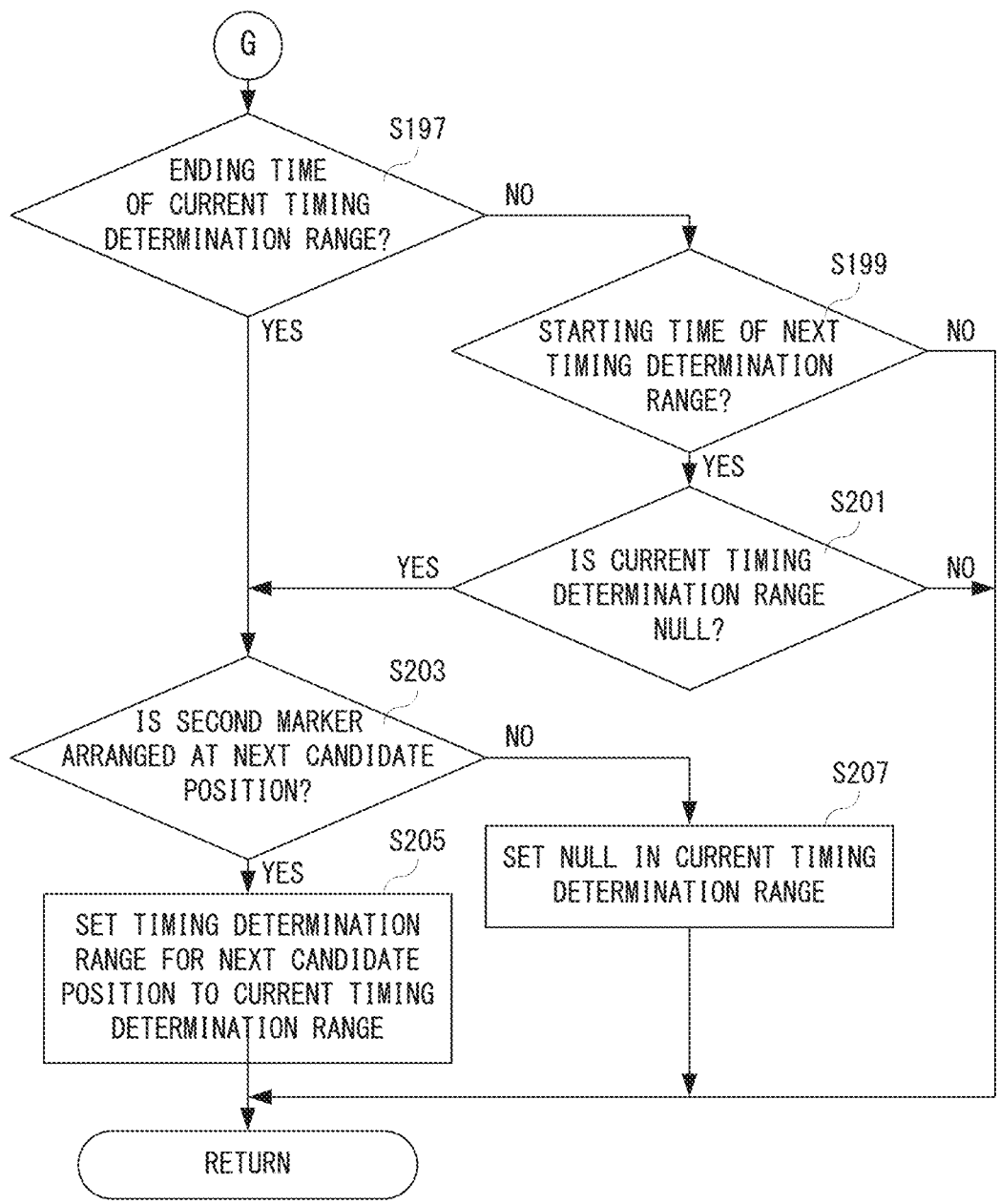
FIG. 27 is a flowchart showing an eighth part of the non-limiting example rhythm game control processing of the processor(s) of the main body apparatus shown in FIG. 6, following FIG. 25 and FIG. 26.

As shown in FIG. 27, in the step S197, it is determined whether a count value of the timer 854x is an end time of the current timing determination range. If "YES" is determined in the step S197, that is, if the count value of the timer 854x is an end time of the current timing determination range, the process proceeds to a step S203. On the other hand, if "NO" is determined in the step S197, that is, if the count value of the timer 854x is not an end time of the current timing determination range, in a step S199, it is determined whether the count value of the timer 854x is a start time of the timing determination range that is set for a next candidate position.

If "NO" is determined in the step S199, that is, if the count value of the timer 854x is not a start time of the timing determination range that is set for a next candidate position, the rhythm game control processing is ended to return to the game control processing. On the other hands, if "YES" is determined in the step S199, that is, if the count value of the timer 854x is a start time of the timing determination range that is set for a next candidate position, it is determined, in a step S201, whether NULL is set to the current timing determination range.

If "NO" is determined in the step S201, that is, if NULL is not set to the current timing determination range, the rhythm game control processing is ended to return to the game control processing. On the other hand, if "YES" is determined in the step S201, that is, if NULL is set to the current timing determination range, the process proceeds to the step S203.

In the step S203, it is determined whether the second marker 232 is arranged at a next candidate position. However, when the current candidate position is the reference candidate position, a next candidate position is the first candidate position (i.e., the candidate position for the first beat) in a next bar.

If "YES" is determined in the step S203, that is, if the second marker 232 is arranged at the next candidate position, in a step S205, the timing determination range for the next candidate position is set to the current timing determination range, and the rhythm game control processing is ended to return to the game control processing.

On the other hands, if "NO" is determined in the step S203, that is, if the second marker 232 is not arranged at the next candidate position, in a step S207, NULL is set to the current timing determination range, and the rhythm game control processing is ended to return to the game control processing.

In addition, when it is determined, in the overall processing, that the rhythm game control processing is to be ended, the processor 81 forcibly ends the rhythm game control processing.

According to the embodiment, since the stick is operated to be tilted toward a direction that the second marker 232 is arranged at a timing that the first marker 230 that is moved along the orbiting trajectory 240 arrives at a position designated by the second marker 232, it is possible to play a new rhythm game according to intuition.

In addition, in the above-described embodiment, the rhythm game is executable when a predetermined condition is satisfied in the main story of the virtual game, but only the rhythm game may be executed instead of in the main story of the virtual game. That is, the rhythm game control processing shown in FIG. 20-FIG. 27 may be executed in the step S5.

Moreover, although the second marker is arranged on the orbiting trajectory along which the first marker is moved in the above-described embodiment, it does not need to be limited to this. It may modify to a configuration in which the second marker is arranged inside or outside the orbiting trajectory and an arrow mark is displayed toward the orbiting trajectory from the second marker so as to designate a position that the player should operate.

Furthermore, although it is operated using the analog stick that the stick is operated to be tilted in the above-described embodiment, an operating device that the stick is operated to be sild may be used.

Furthermore, in the above-described embodiment, the L stick is operated once to be tilted toward a direction that the second marker is arranged, but it should not be limited. An operation of maintaining a state that the L stick is being tilted toward a direction either one of two adjacent second markers may be performed between the two adjacent second markers, or an operation of quickly tilting the L stick twice in a direction that the second marker having a shape different from that of the embodiment is arranged may be performed.

Figure 28:
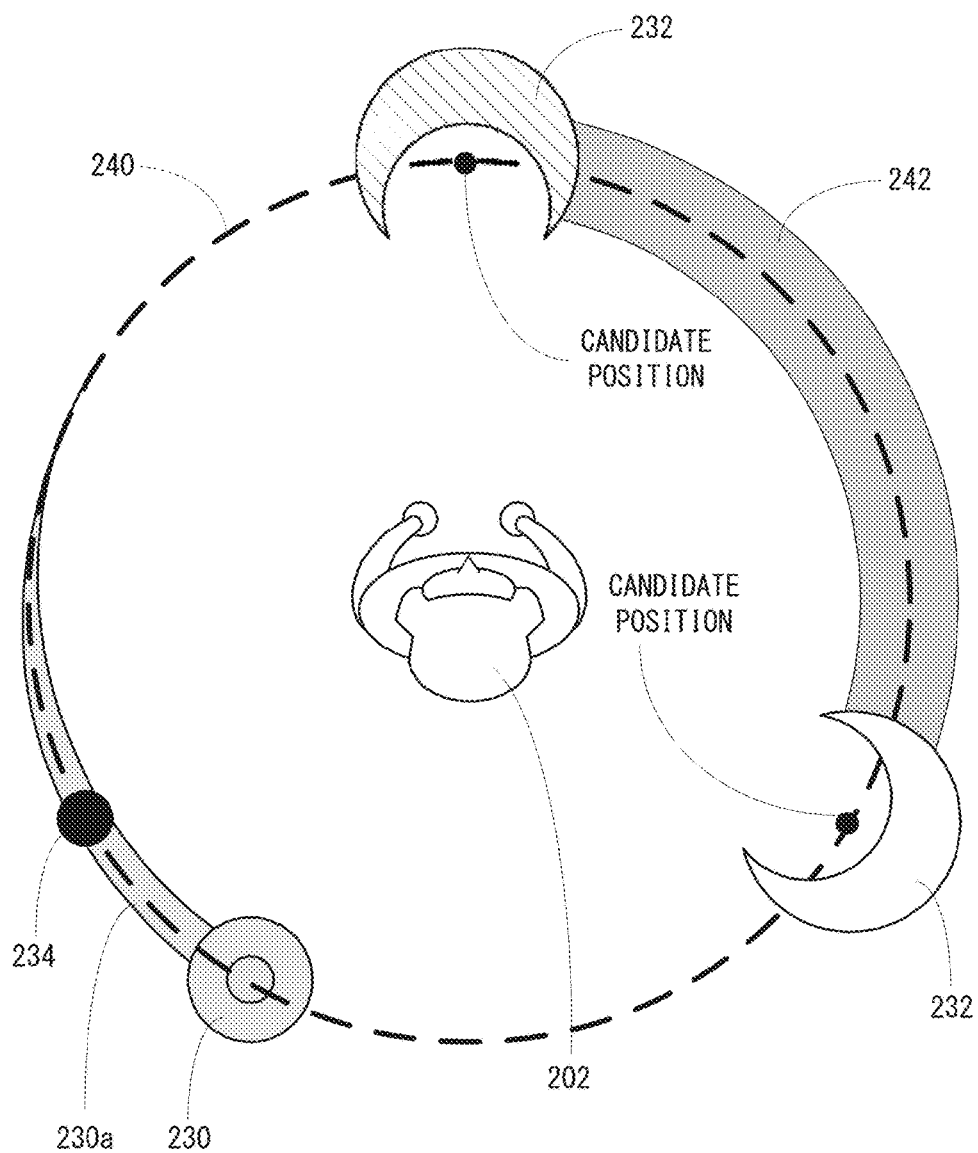
FIG. 28 is a view showing a non-limiting example positional relationship of a player character, a first marker, two second markers, a third marker and a coupling object, viewed from right above of the virtual space.

In the former case, it is assumed as shown in FIG. 28 that a belt-like coupling object 242 is arranged between adjacent two second markers 232 to be along (or overlapped with) the orbiting trajectory 240, when the first marker 230 is moved between the two second markers 232, the player tilts the analog stick 32 in the direction that either one of the two second markers 232 is arranged, and maintains that state during a time period that the first marker 230 is being moved on the coupling object 242. In this case, it is determined whether the analog stick 32 remains to be tilted during the time the first marker 230 is moved between the two second markers 232 that are coupled to each other by the coupling object 242, and it is determined whether the tilting direction of the analog stick 32 is within the direction determination range that is set with respect to the two second markers 232.

Figure 29:
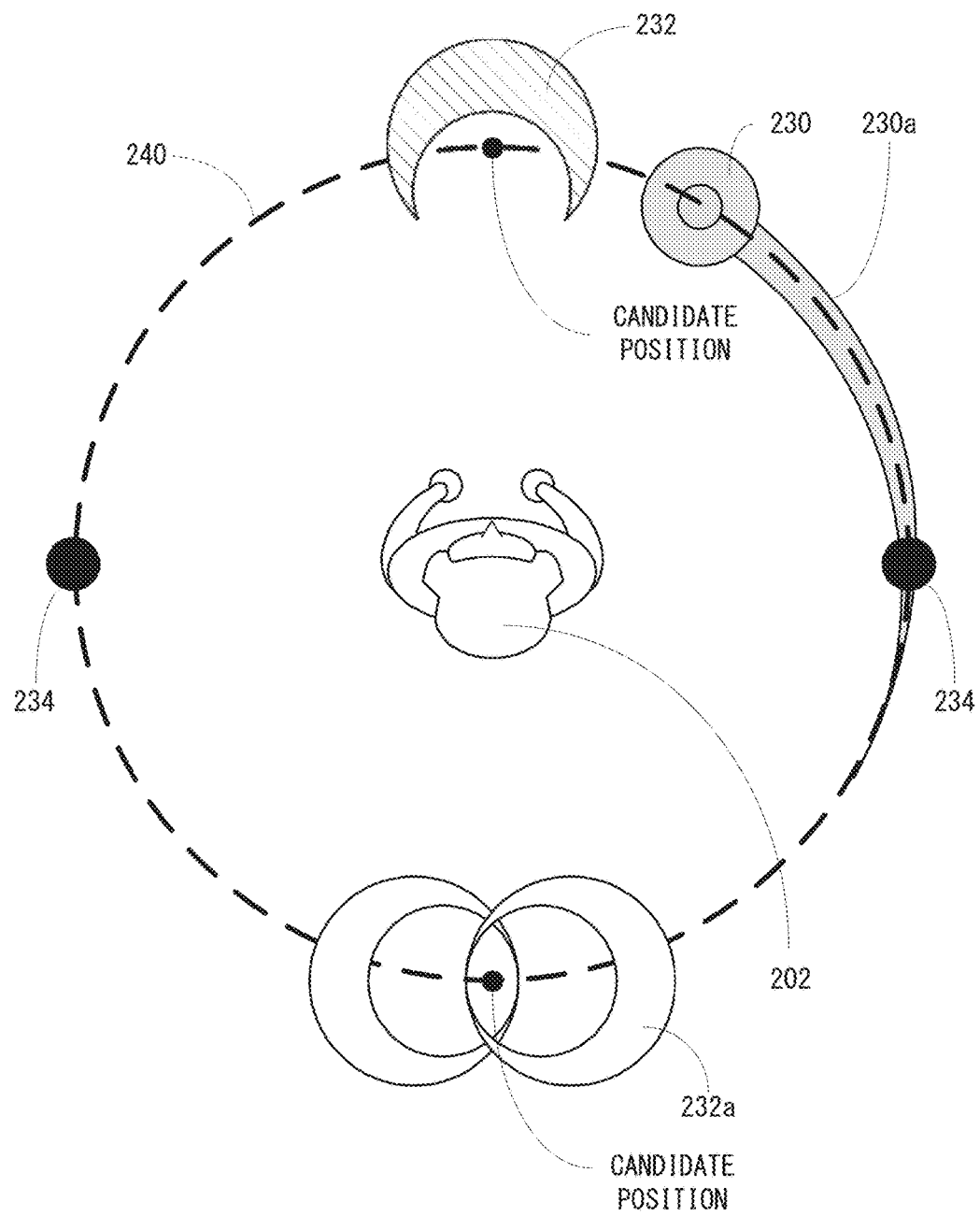
FIG. 29 is a view showing a non-limiting example positional relationship of a player character, a first marker, two second markers of different kinds and two third markers, viewed from right above of the virtual space.

In the latter case, it is assumed as shown in FIG. 29 that the second markers 232a are arranged by overlapping two rings, when the first marker 230 arrives at the candidate position that these second markers 232a are arranged, the player quickly tilts the analog stick 32 twice in the direction that the second markers 232a are arranged. In this case, it is determined whether the analog stick 32 is tilted twice in the timing determination range that is set with respect to the second markers 232a, and it is determined whether the tilting direction of the analog stick 32 is within the direction determination range that is set with respect to the second markers 232a.

Moreover, although the end point marker 232 is arranged in a direction that the player character 202 faces at the time of starting the rhythm game in the above-described embodiment, it does not need to be limited to this. The end point marker 232 may be arranged at a position nearest to a predetermined object (in the embodiment, flower object 210a) in the orbiting trajectories 240 that is determined at the time of starting the rhythm game. However, since the predetermined object is arranged in a plural number, the end point marker 232 is arranged at a position of the predetermined object nearest to the orbiting trajectory 240 or a position nearest to a position midway among the plurality of predetermined objects.

Furthermore, although the orbiting trajectory 240 is made into a shape of circle in the above-described embodiment, it may be an oval or polygonal in shape. For example, when making the orbiting trajectory 240 into an oval shape, three or four rhythm markers according to the beat of the BGM are arranged on the orbiting trajectory 240 so that the time that the first marker 230 is moved between two adjacent rhythm markers becomes the same time interval. Moreover, in a case of a BGM of four-quarter time, the orbiting trajectory 240 may be formed into a shape of regular polygon having vertices that are multiples of four (4), such as a rhombus or square, and the rhythm markers may be arranged at four (4) vertices so that the time that the first marker 230 is moved to between two adjacent rhythm markers becomes the same time interval. Furthermore, in a case of a BGM of three-quarter time, the orbiting trajectory 240 may be formed into a shape of regular polygon having vertices that are multiples of three, such as an equilateral triangle, and the rhythm markers may be arranged at three vertices so that the time that the first marker 230 is moved to two adjacent rhythm markers becomes the same time interval.

In addition, when a plurality of rhythm markers are arranged so that the time that the first marker 230 is moved between two adjacent rhythm markers becomes the same time interval, the orbiting trajectory 240 may be formed into a shape of polygon other than a regular polygon.

Moreover, although the timing determination range is set in terms of time in the above-described embodiment, should not be limited. A length L of one round of the orbiting trajectory 240 is a fixed, and the moving speed of the first marker 230 can be calculated, and therefore, the timing determination range can also be set based on a rotation angle or a distance from the start position on the orbiting trajectory 240. Specifically, if assuming that 20 percent of the time required for moving the first marker 230 one round is a length of the timing determination range, in a case of three-quarter time, the timing determination range is set to a range that a central angle including the candidate position that the beat is ticked is 72 degrees or a range that a length of an arc including the candidate position that the beat is ticked is 0.2 L. In this case, as shown in the embodiment, it is possible to set the timing determination range so that the length after the candidate position becomes longer than before the candidate position, or lengths before and after the candidate position are the same, or the length before the candidate position becomes longer than after the candidate position. However, the timing determination range is set with respect to each candidate position in a range an angle or length corresponding to a timing that the determination is started from the reference candidate position and an angle or length corresponding to a timing that the determination is ended from the reference candidate position.

Furthermore, although the rhythm game is ended when an operation of the ZL button is stopped in the above-described embodiment, should not be limited. When the rhythm game is cleared, the rhythm game may be ended. In this case, the first marker continues to be moved along the orbiting trajectory until the rhythm game is cleared.

In addition, although the game system 1 is shown as an example of a game system in the above-described embodiment, its configuration should not be limited, and other configurations may be adopted. For example, in the above-described embodiment, the above-described "computer" is a single computer (specifically, the processor 81), but it may be a plurality of computers in other embodiments. The above-described "computer" may be a plurality of computers provided in a plurality of apparatuses, for example, and more specifically, the above-described "computer" may be constituted by the processor 81 of the main body apparatus 2 and the communication control sections (microprocessor) 101 and 111 provided on the controllers.

Moreover, although a case where the game image is displayed on the display 12 is described in the above-described embodiment, it does not need to be limited to this. The game image can be displayed also on a stationary monitor (e.g., television monitor) by connecting the main body apparatus 2 to the stationary monitor via a cradle. In such a case, it is possible to constitute a game system including the game system 1 and the stationary monitor.

Furthermore, although the above-described embodiment are described on a case where the game system 1 having structure that the left controller 3 and the right controller 4 are attachable to or detachable from the main body apparatus 2 is used, it does not need to be limited to this. For example, it is possible to use a game apparatus including the main body apparatus 2 integrally provided with an operation portion having operation buttons and analog sticks similar to those of the left controller 3 and the right controller 4, or a game apparatus such as further electronic equipment capable of executing a game program. The further electronic equipment corresponds to smartphones, tablet PCs or the like. In such a case, an operation portion may constitute with software keys.

Furthermore, specific numeral values and images shown in the above-described embodiment are mere examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer-readable storage medium having stored with a game program executable by an information processing apparatus comprising one or more processors, wherein the game program causes the one or more processors of the information processing apparatus to execute:

acquiring operation direction data that is transmitted from a control device provided with the stick capable of manually performing a tilting operation or sliding operation in an arbitrary direction and indicates a direction that a stick is operated; and executing first game processing, in the first game processing, moving, in a virtual space, a first marker orbitally along an orbiting trajectory;

arranging a second marker indicating a position along the orbiting trajectory; and determining that a stick operation is in success if the operation direction data indicates that the stick is operated in a predetermined direction corresponding to a position indicated by the second marker when the first marker exists in a predetermined range including the position indicated by the second marker.

2. The storage medium according to the claim 1, wherein the game program causes the one or more processors to execute:

executing second game processing different from the first game processing;

moving, in the second game processing, a player character in the virtual space based on the operation direction data; and setting, in the first game processing, the orbiting trajectory to surround the player character.

3. The storage medium according to the claim 2, wherein the game program causes the one or more processor to execute starting the first game processing when player character performs a predetermined action during execution of the second game processing.

4. The storage medium according to the claim 3, wherein the predetermined action is an action that the player character performs with facing a direction of an object arranged in the virtual space, wherein the game program causes the one or more processors to execute setting the position indicated by the second marker based on a positional relationship between a direction of the player character and the object.

5. The storage medium according to the claim 3, wherein the game program causes the one or more processors to execute:

reproducing continuously a musical piece that is being reproduced in the second game processing at a time of starting the first game processing during the second game processing; and arranging the second marker to indicate a position(s) of a number equal to or less than a maximum arranging number corresponding to a beat of the musical piece.

6. The storage medium according to the claim 3, wherein the game program causes the one or more processors to execute:

reproducing continuously a musical piece that is being reproduced in the second game processing, when starting the first game processing during the second game processing; and determining the position indicated by the second marker out of multiple candidate positions that are along the orbiting trajectory and set based on a beat of the musical piece.

7. The storage medium according to the claim 6, wherein the game program causes the one or more processors to execute:

executing the first game processing in a plurality of times continuously;

determining, for each first game processing, the position indicated by the second marker out of the candidate positions; and generating a sound effect when the first marker exists at a position overlapping with the candidate positions.

8. The storage medium according to the claim 7, wherein the game program causes the one or more processors to execute generating another different sound effect when the first marker exists at a position overlapping with the position indicated by the second marker out of the candidate positions.

9. The storage medium according to the claim 3, wherein the game program causes the one or more processors to execute:

reproducing continuously a musical piece that is being reproduced in the second game processing at a time of starting the first game processing during the second game processing; and setting a speed for moving the first marker based on a tempo of the musical piece.

10. The storage medium according to the claim 1, wherein the game program causes the one or more processors to execute:

moving the first marker along the orbiting trajectory in a plurality of rounds in the first game processing; and determining in the first game processing that the first game processing is cleared at a time that all operations with respect to the second markers are successfully performed in an order being set during one round of the orbiting trajectory.

11. The storage medium according to the claim 10, wherein the second marker that is set at a first place or a last place in the order out of the second markers that are set in the order has a visual feature different from those of remaining second markers.

12. The storage medium according to the claim 11, wherein the game program causes the one or more processors to execute arranging the second marker that is set at a first place or a last place in the order so as to indicate a position based on the direction that the player character faces out of the positions along the orbiting trajectory.

13. The storage medium according to the claim 11, wherein the game program causes the one or more processors to execute making, in the first game processing, different from each other, the sound effect generated at a time that the first marker exists at a position overlapping with the position indicated by the second marker that is set at the first place or the last place in the order and the sound effect generated at a time that the first marker exists at a position overlapping with the position indicated by the second marker different from the second maker that is set at the first place or the last place in the order.

14. The storage medium according to the claim 1, wherein the game program causes the one or more processors to execute arranging the second positions in plural number to have a central angle between adjacent positions is equal to or larger than 90 degrees or more.

15. The storage medium according to the claim 1, wherein the game program causes the one or more processors to execute displaying a locus that the first marker is moved during a predetermined time period.

16. A game system comprising one or more processors, wherein in the game processing, the one or more processors is configured to execute:

acquiring operation direction data that is transmitted from a control device provided with the stick capable of manually performing a tilting operation or sliding operation in an arbitrary direction and indicates a direction that a stick is operated; and executing first game processing, in the first game processing, moving, in a virtual space, a first marker orbitally along an orbiting trajectory;

arranging a second marker indicating a position along the orbiting trajectory; and determining that a stick operation is in success if the operation direction data indicates that the stick is operated in a predetermined direction corresponding to a position indicated by the second marker when the first marker exists in a predetermined range including the position indicated by the second marker.

17. A game control method of a game apparatus, wherein the game control method comprising:

acquiring operation direction data that is transmitted from a control device provided with the stick capable of manually performing a tilting operation or sliding operation in an arbitrary direction and indicates a direction that a stick is operated; and executing first game processing, in the first game processing, moving, in a virtual space, a first marker orbitally along an orbiting trajectory;

arranging a second marker indicating a position along the orbiting trajectory; and determining that a stick operation is in success if the operation direction data indicates that the stick is operated in a predetermined direction corresponding to a position indicated by the second marker when the first marker exists in a predetermined range including the position indicated by the second marker.

\* \* \* \* \*